(12) United States Patent
Zheng et al.

(10) Patent No.: US 12,501,405 B2
(45) Date of Patent: Dec. 16, 2025

(54) MULTIPLE COMPONENT CARRIER SIMULTANEOUS TRANSMISSION CONTROL INDICATOR STATE ACTIVATION WITH MULTIPLE TRANSMISSION AND RECEPTION POINT TRANSMISSION

(71) Applicant: QUALCOMM Incorporated, San Diego, CA (US)

(72) Inventors: Ruiming Zheng, Beijing (CN); Yan Zhou, San Diego, CA (US); Linhai He, San Diego, CA (US); Tao Luo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 401 days.

(21) Appl. No.: 18/041,760

(22) PCT Filed: Sep. 9, 2020

(86) PCT No.: PCT/CN2020/114239
§ 371 (c)(1),
(2) Date: Feb. 15, 2023

(87) PCT Pub. No.: WO2022/051940
PCT Pub. Date: Mar. 17, 2022

(65) Prior Publication Data
US 2023/0319786 A1    Oct. 5, 2023

(51) Int. Cl.
*H04W 72/02* (2009.01)
*H04W 72/1273* (2023.01)
(Continued)

(52) U.S. Cl.
CPC ....... *H04W 72/02* (2013.01); *H04W 72/1273* (2013.01); *H04W 72/231* (2023.01); *H04W 76/20* (2018.02)

(58) Field of Classification Search
CPC ... H04L 5/0005; H04L 5/0023; H04L 5/0044; H04L 5/0053; H04L 5/0094; H04L 5/001;
(Continued)

(56) References Cited

U.S. PATENT DOCUMENTS

| 12,255,770 | B2* | 3/2025 | Sun ..................... H04L 41/0803 |
| 12,267,695 | B2* | 4/2025 | Jung ........................ H04L 1/08 |

(Continued)

FOREIGN PATENT DOCUMENTS

| CN | 110798894 A | 2/2020 |
| CN | 111093219 A | 5/2020 |
| WO | 2020029725 A1 | 2/2020 |

OTHER PUBLICATIONS

International Search Report and Written Opinion—PCT/CN2020/114239—ISA/EPO—May 27, 2021.

(Continued)

*Primary Examiner* — Lan-Huong Truong
(74) *Attorney, Agent, or Firm* — Loza & Loza, LLP

(57) ABSTRACT

Aspects relate to sending a transmission control indicator (TCI) state activation in a multiple transmission and reception point (multi-TRP) transmission system having multiple component carriers. A component carrier (CC) list of component carrier identifiers (IDs) may be configured to either exclude or include a select CC ID prior to sending a transmission configuration indicator (TCI) state activation within control signaling to at least one user equipment (UE) in the RAN. Depending on whether the CC ID is excluded or included in the CC list, the receiving UEs in the system may be configured to apply a TCI state activation for the CC ID either included or excluded in the CC list, or not apply any TCI state to any CC ID by ignoring the control signaling.

18 Claims, 15 Drawing Sheets

(51) Int. Cl.
*H04W 72/231* (2023.01)
*H04W 76/20* (2018.01)

(58) Field of Classification Search
CPC ............. H04W 72/02; H04W 72/1273; H04W 72/231; H04W 76/20
See application file for complete search history.

(56) References Cited

U.S. PATENT DOCUMENTS

| | | |
|---|---|---|
| 2020/0229161 A1 | 7/2020 | Raghavan et al. |
| 2022/0278787 A1* | 9/2022 | Liu ....................... H04W 72/51 |
| 2022/0295589 A1* | 9/2022 | Tsai ..................... H04B 17/309 |
| 2023/0156485 A1* | 5/2023 | Zhang .................. H04W 16/28 |
| | | 370/329 |

OTHER PUBLICATIONS

OPPO: "Report of [108#68][NR eMIMO] Design of DL MAC CEs", R2-2000660, 3GPP TSG-RAN WG2 Meeting #109 Electronic, Feb. 24-Mar. 6, 2020, Feb. 14, 2020, Sections 2.3-2.4, pp. 18-19, pp. 1-44.

* cited by examiner

MULTIPLE COMPONENT CARRIER SIMULTANEOUS TRANSMISSION CONTROL INDICATOR STATE ACTIVATION WITH MULTIPLE TRANSMISSION AND RECEPTION POINT TRANSMISSION

CROSS-REFERENCE TO RELATED APPLICATION(S)

This application is the U.S. national stage of PCT patent application number PCT/CN2020/114239 filed on Sep. 9, 2020.

TECHNICAL FIELD

The technology discussed below relates generally to wireless communication networks, and more particularly, to the sending a transmission control indicator (TCI) state activation in a multiple transmission and reception point (multi-TRP) transmission system having multiple component carriers (CCs).

BACKGROUND

Wireless communication between devices may be facilitated by various network configurations. In one configuration, a wireless network may enable wireless communication devices (e.g., user equipment (UEs)) to communicate with one another through signaling with a nearby base station or cell.

In wireless communication systems, such as those specified under standards for 5G New Radio (NR), multiple transmission and reception points (TRPs) may be utilized to serve a user equipment (UE). Additionally, carrier aggregation using multiple component carriers (CCs) may be utilized in a multi-TRP system in 5G NR.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In aspects, a method for wireless communication in a radio access network (RAN) node for a RAN having a plurality of transmission and reception points (TRPs) is provided. The method includes configuring a component carrier (CC) list of component carrier identifiers (IDs) to exclude a select CC ID prior to sending a transmission configuration indicator (TCI) state activation within control signaling to at least one user equipment (UE) in the RAN. Additionally, the method includes transmitting the configured CC list to the UE through radio resource control (RRC) signaling.

In other aspects, a radio access network (RAN) node in a RAN of a wireless communication system having a plurality of transmission and reception points (TRPs) is disclosed. The RAN nodes includes a wireless transceiver, a memory, and a processor communicatively coupled to the wireless transceiver and the memory. The processor and the memory are configured to configure a component carrier (CC) list of component carrier identifiers (IDs) to exclude a select CC ID prior to sending a transmission configuration indicator (TCI) state activation within control signaling to at least one user equipment (UE) in the RAN. The processor and the memory are also configured to transmit the configured CC list to the UE through radio resource control (RRC) signaling.

In yet other aspects, a method for wireless communication in a radio access network (RAN) node for a RAN having a plurality of transmission and reception points (TRPs) is disclosed. The method includes configuring a component carrier (CC) list of component carrier identifiers (IDs) to include a select CC ID prior to sending a transmission configuration indicator (TCI) state activation within control signaling to at least one user equipment (UE) in the RAN. Furthermore, the method includes transmitting the configured CC list to the UE through radio resource control (RRC) signaling.

In still other aspects, a radio access network (RAN) node in a RAN of a wireless communication system having a plurality of transmission and reception points (TRPs) is disclosed. The RAN node includes a wireless transceiver, a memory, and a processor communicatively coupled to the wireless transceiver and the memory. The processor and the memory are configured to configure a component carrier (CC) list of component carrier identifiers (IDs) to include a select CC ID prior to sending a transmission configuration indicator (TCI) state activation within control signaling to at least one user equipment (UE) in the RAN. Further, the processor and the memory are configured to transmit the configured CC list to the UE through radio resource control (RRC) signaling.

According to yet other aspects, a method for wireless communication in a UE in a radio access network (RAN) having a plurality of transmission and reception points (TRPs) is disclosed. The method includes receiving control signaling including at least one transmission configuration indicator (TCI) state activation related to at least one select component carrier (CC) identifier (ID). Further, the method includes determining whether the at least one select CC ID is a part of a preconfigured CC list that is configured by the RAN. Also, the method includes applying the at least one TCI state activation for a CC corresponding to the at least one select CC ID received in the control signaling when the at least one select CC ID is determined to be a part of a preconfigured CC list.

In still more aspects, a user equipment (UE) operable in a wireless communication system having a plurality of transmission and reception points (TRPs) is disclosed having a wireless transceiver, a memory, and a processor communicatively coupled to the wireless transceiver and the memory. The processor and the memory are configured to receive control signaling including at least one transmission configuration indicator (TCI) state activation related to at least one select component carrier (CC) identifier (ID). Additionally, the processor and the memory are configured to determine whether the at least one select CC ID is a part of a preconfigured CC list that is configured by the RAN. The processor and the memory are also configured to apply the at least one TCI state activation for a CC corresponding to the at least one select CC ID received in the control signaling when the at least one select CC ID is determined to be a part of a preconfigured CC list.

According to more aspects, a method for wireless communication in a UE in a radio access network (RAN) having a plurality of transmission and reception points (TRPs) is disclosed. The method includes receiving control signaling including at least one transmission configuration indicator (TCI) state activation related to at least one select component carrier (CC) identifier (ID). Further, the method includes determining whether the at least one select CC ID is a part of a preconfigured CC list that is configured by the RAN, and applying the at least one TCI state activation for all CCs in the preconfigured CC list when the at least one select CC ID received in the control signaling is determined to be a part of a preconfigured CC list.

In yet further aspects, a user equipment (UE) operable in a wireless communication system having a plurality of transmission and reception points (TRPs) is disclosed. The UE includes a wireless transceiver, a memory, and a processor communicatively coupled to the wireless transceiver and the memory. The processor and the memory are configured to receive control signaling including at least one transmission configuration indicator (TCI) state activation related to at least one select component carrier (CC) identifier (ID). Further, the processor and the memory are configured to determine whether the at least one select CC ID is a part of a preconfigured CC list that is configured by the RAN, and apply the at least one TCI state activation for all CCs in the preconfigured CC list when the at least one select CC ID received in the control signaling is determined to be a part of a preconfigured CC list.

According to yet another aspect, a method for wireless communication in a UE in radio access network (RAN) having a plurality of transmission and reception points (TRPs) is disclosed. The method includes receiving control signaling including at least one transmission configuration indicator (TCI) state activation related to at least one select component carrier (CC) identifier (ID). Additionally, the method includes determining whether the at least one select CC ID is a part of a preconfigured CC list that is configured by the RAN. Moreover, the method includes ignoring the at least one TCI state activation when the at least one select CC ID is determined to be a part of a preconfigured CC list.

In yet one more aspect, a user equipment (UE) operable in a wireless communication system having a plurality of transmission and reception points (TRPs) is disclosed. The UE includes a wireless transceiver, a memory, and a processor communicatively coupled to the wireless transceiver and the memory. The processor and the memory are configured to receive control signaling including at least one transmission configuration indicator (TCI) state activation related to at least one select component carrier (CC) identifier (ID). Additionally, the processor and memory are configured to determine whether the at least one select CC ID is a part of a preconfigured CC list that is configured by the RAN. Moreover, the processor and the memory are configured to ignore the at least one TCI state activation when the at least one select CC ID is determined to be a part of a preconfigured CC list.

These and other aspects will become more fully understood upon a review of the detailed description, which follows. Other aspects, features, and embodiments will become apparent to those of ordinary skill in the art, upon reviewing the following description of specific, exemplary embodiments of in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments such exemplary embodiments can be implemented in various devices, systems, and methods.

DETAILED DESCRIPTION

Figure 1:
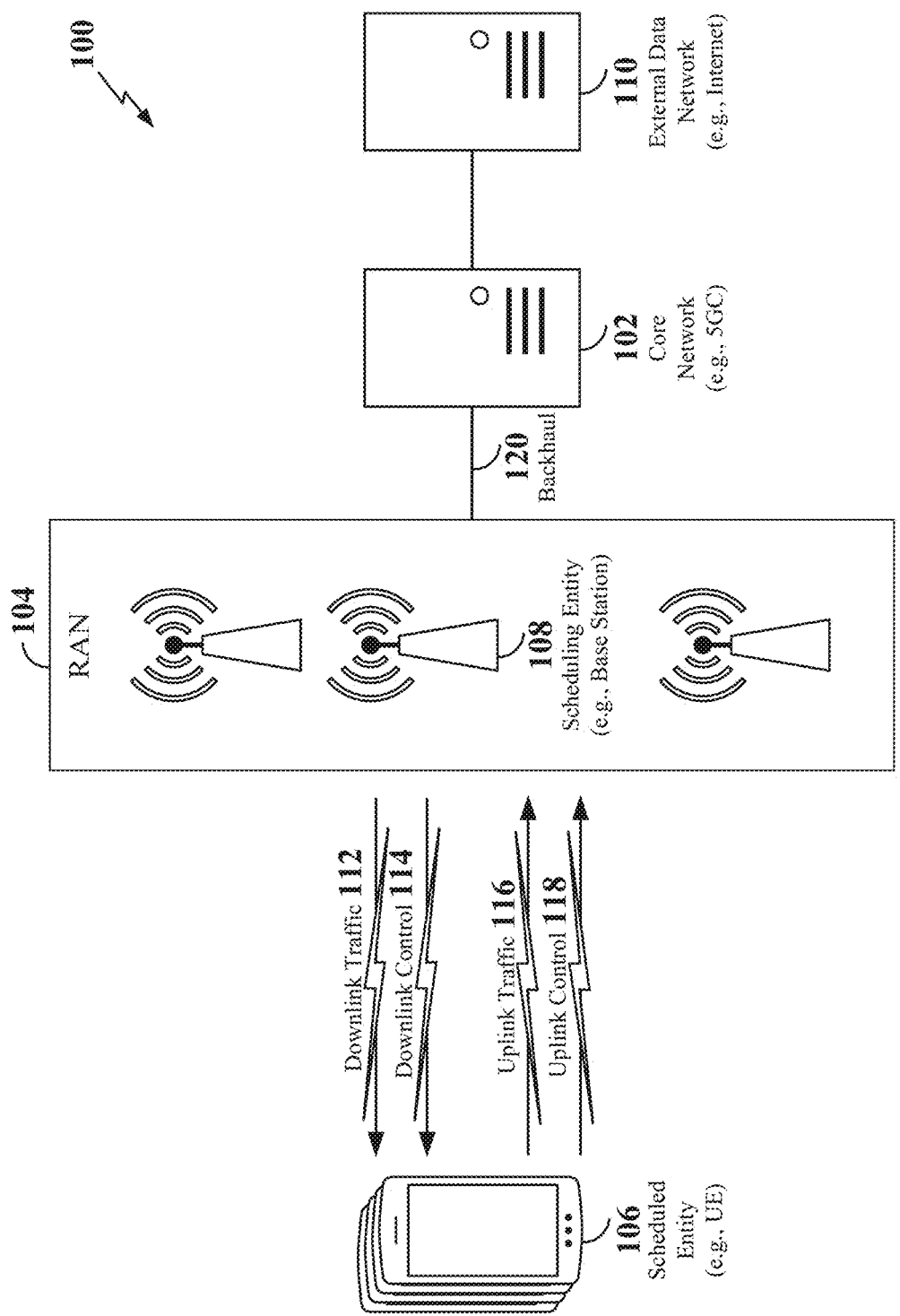
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range in spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a network access node, a transmission and reception point (TRP) or some other suitable terminology. In some examples, a base station may include two or more TRPs that may be co-located or non-co-located. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs). And as discussed more below, UEs may communicate directly with other UEs in peer-to-peer fashion and/or in relay configuration.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
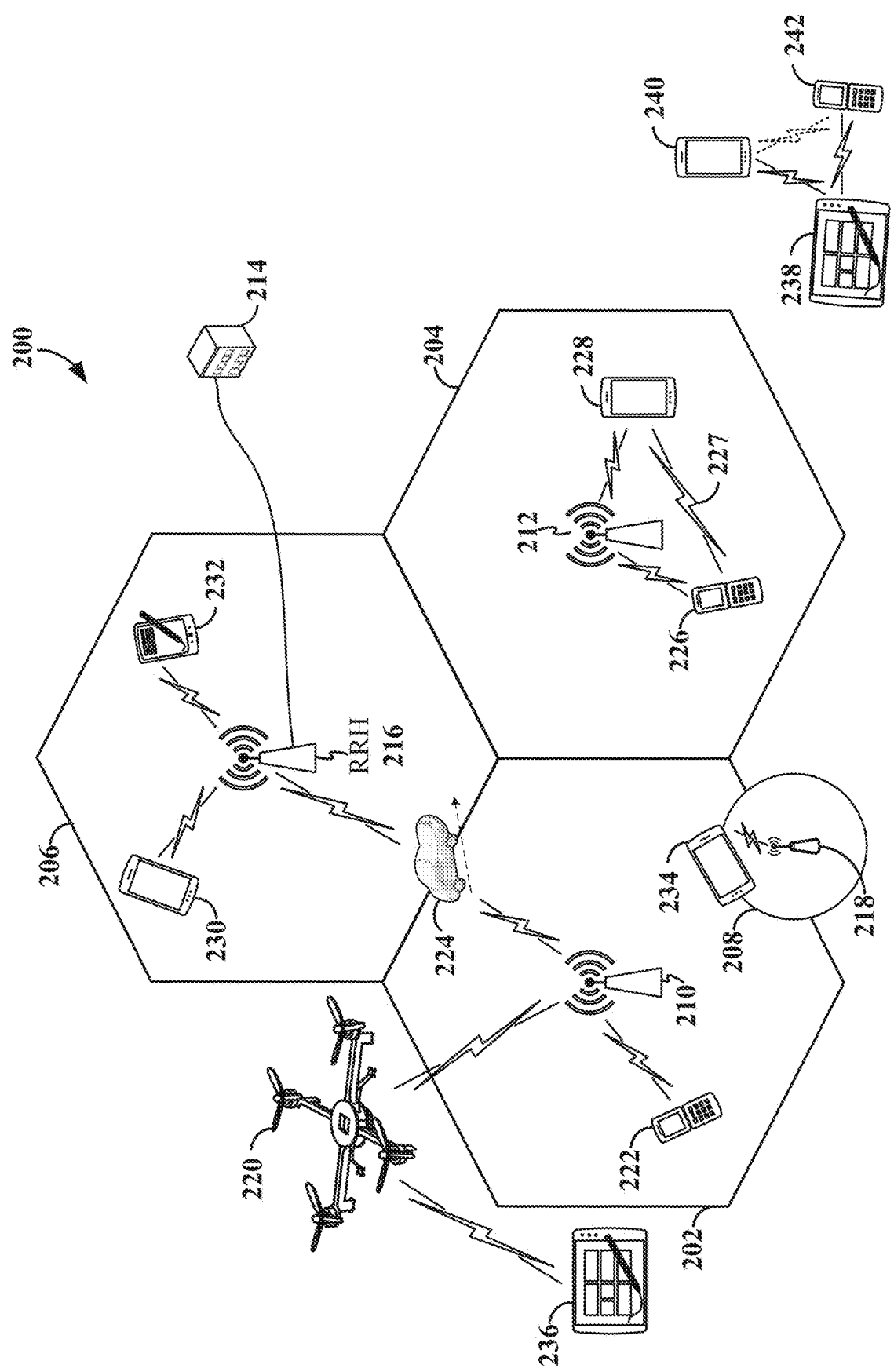
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may each function as a scheduled entity or a non-primary (e.g., secondary) sidelink device. In still another example, a UE may function as a scheduling entity or scheduled entity in a device-to-device (D2D), peer-to-peer (P2P), vehicle-to-vehicle (V2V) network, vehicle-to-everything (V2X) and/or in a mesh network. In a mesh network example, UEs 240 and 242 may optionally communicate directly with one another in addition to communicating with the UE 238 (functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic and sidelink control.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (cp). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes. The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequency implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible full-duplex.

Various aspects of the present disclosure will be described with reference to an OFDM waveform, schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 3:
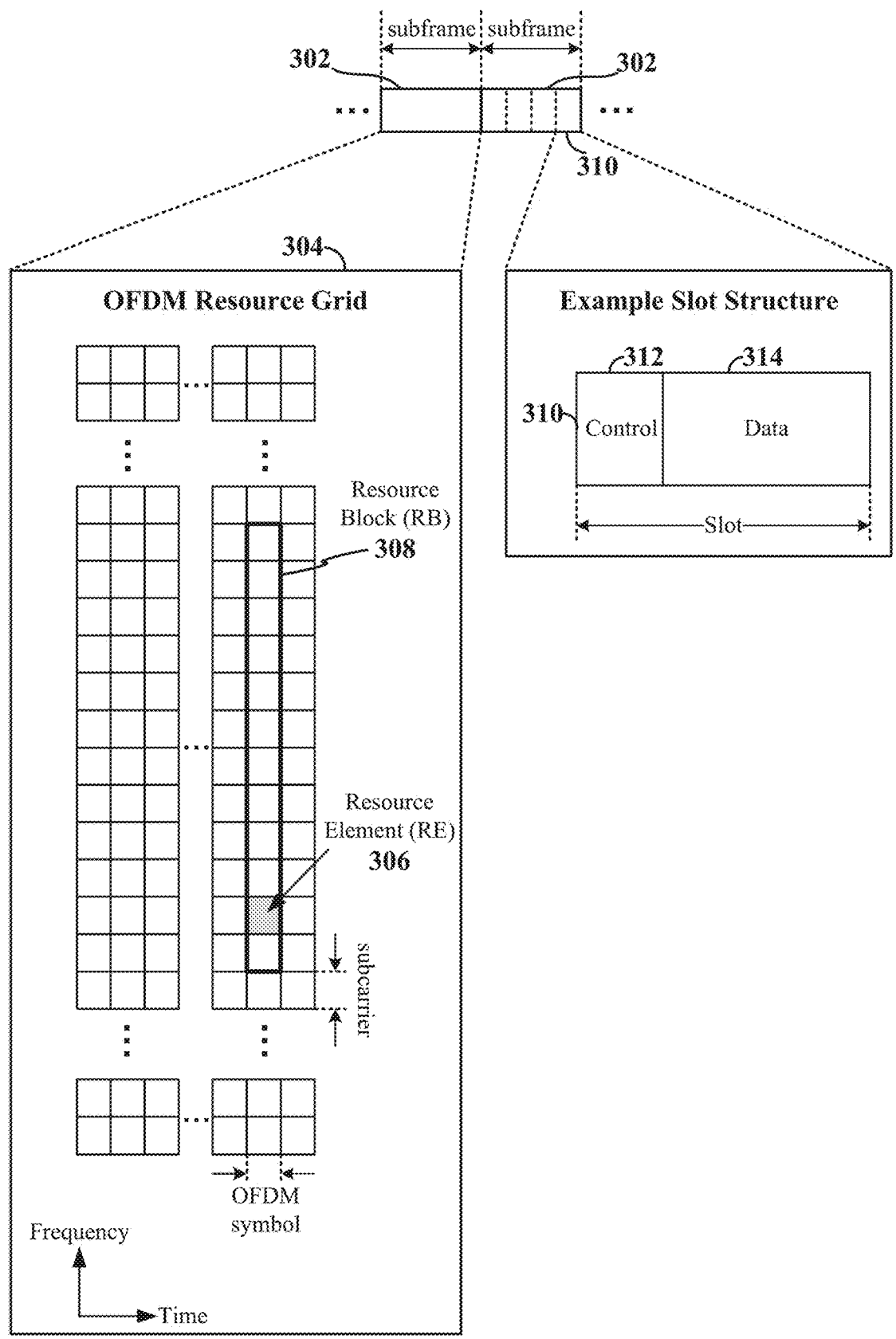
FIG. 3 is a diagram illustrating an example of a frame structure for use in a radio access network according to some aspects.

Referring now to FIG. 3, an expanded view of an example DL subframe 302 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink or uplink transmissions typically involves scheduling one or more resource elements 306 within one or more sub-bands. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 308 is shown as occupying less than the entire bandwidth of the subframe 302, with some subcarriers illustrated above and below the RB 308. In a given implementation, the subframe 302 may have a bandwidth corresponding to any number of one or more RBs 308. Further, in this illustration, the RB 308 is shown as occupying less than the entire duration of the subframe 302, although this is merely one possible example.

Each 1 ms subframe 302 may consist of one or multiple adjacent slots. In the example shown in FIG. 3, one subframe 302 includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels, and the data region 314 may carry data channels. Of course, a slot may contain all DL, all UL, or at least one DL portion and at least one UL portion. The structure illustrated in FIG. 3 is an example, and different slot structures may be utilized, and may include one or more of each of the control region(s) and data region(s).

Although not illustrated in FIG. 3, the various REs 306 within a RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In a DL transmission, the transmitting device (e.g., the scheduling entity) may allocate one or more REs 306 (e.g., within a control region 312) to carry DL control information including one or more DL control channels, such as a PBCH and/or a physical downlink control channel (PDCCH), etc., to one or more scheduled entities. The PDCCH carries downlink control information (DCI) including but not limited to power control commands, scheduling information, a grant, and/or an assignment of REs for DL and UL transmissions. The transmitting device may further allocate one or more REs 306 to carry other DL signals, such as a DMRS; a phase-tracking reference signal (PT-RS); a channel state information-reference signal (CSI-RS); a primary synchronization signal (PSS); and a secondary synchronization signal (SSS). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The synchronization signals PSS and SSS, and in some examples, the PBCH and a PBCH DMRS, may be transmitted in a synchronization signal block (SSB) that includes 4 consecutive OFDM symbols, numbered via a time index in increasing order from 0 to 4. In the frequency domain, the SSB may extend over 240 contiguous subcarriers, with the subcarriers being numbered via a frequency index in increasing order from 0 to 249. Of course, the present disclosure is not limited to this specific SSB configuration. Other non-limiting examples may utilize greater or fewer than two synchronization signals; may include one or more supplemental channels in addition to the PBCH; may omit a PBCH; and/or may utilize a different number of symbols/frequencies and/or nonconsecutive symbols/frequencies for an SSB, within the scope of the present disclosure.

The PBCH may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

As discussed above, a BS may transmit synchronization signals (e.g., including PSS and SSS) in the network to enable UEs to synchronize with the BS, as well as SI (e.g., including a MIB, RMSI, and OSI) to facilitate initial network access. The BS may transmit the PSS, the SSS, and/or the MIB via SSBs over PBCH and may broadcast the RMSI and/or the OSI over the PDSCH.

A UE attempting to access the network may perform an initial cell search by detecting a PSS from a BS (e.g., the PSS of a cell of the BS). The PSS may enable the UE to synchronize to period timing of the BS and may indicate a physical layer identity value assigned to the cell. The UE may also receive an SSS from the BS that enables the UE to synchronize on the radio frame level with the cell. The SSS may also provide a cell identity value, which the UE may combine with the physical layer identity value to identify the cell.

After receiving the PSS and SSS, the UE may receive system information from the BS. The system information may take the form of a master information block (MIB) and system information blocks (SIBs). The system information includes essential or critical information for a UE to access the network such as downlink (DL) channel configuration information, uplink (UL) channel configuration information, access class information, and cell barring information, as well as other less critical information. The MIB may include system information for initial network access and scheduling information for RMSI and/or OSI. After decoding the MIB, the UE may receive RMSI and/or OSI.

After obtaining the MIB, the RMSI and/or the OSI, the UE may perform a random access procedure for initial access to a RAN (e.g., the RAN 200 of FIG. 2). The RAN (e.g., a base station) broadcasts information that enables a UE to determine how to conduct the initial access. This information may include a configuration for a random access channel (RACH) that the UE uses to communicate with the RAN during initial access. The RACH configuration may indicate, for example, the resources allocated by the RAN for the RACH (e.g., resources allocated for transmitting RACH preambles and receiving random access responses).

For the random access procedure, the UE may transmit a random access preamble and the BS may respond with a random access response. Upon receiving the random access response, the UE may transmit a connection request to the BS and the BS may respond with a connection response (e.g., contention resolution message). After establishing a connection, the UE and the BS may enter a normal operation stage, where operational data may be exchanged. For example, the BS may schedule the UE for UL communication and/or DL communication.

In an UL transmission, the transmitting device (e.g., the scheduled entity 106) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or an SRS. In some examples, the control information may include a scheduling request (SR), i.e., request for the scheduling entity to schedule uplink transmissions. Here, in response to the SR transmitted on the control channel, the scheduling entity may transmit downlink control information that may schedule resources for uplink packet transmissions. UL control information may also include hybrid automatic repeat request (HARQ) feedback, channel state feedback (CSF), or any other suitable UL control information.

In addition to control information, one or more REs 306 (e.g., within the data region 314) may be allocated for user data traffic. Such traffic may be carried on one or more traffic channels, such as, for a DL transmission, a physical downlink shared channel (PDSCH); or for an UL transmission, a physical uplink shared channel (PUSCH). In some examples, one or more REs 306 within the data region 314 may be configured to carry SIBs (e.g., SIB1), carrying information that may enable access to a given cell.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above in connection with FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

Figure 4:
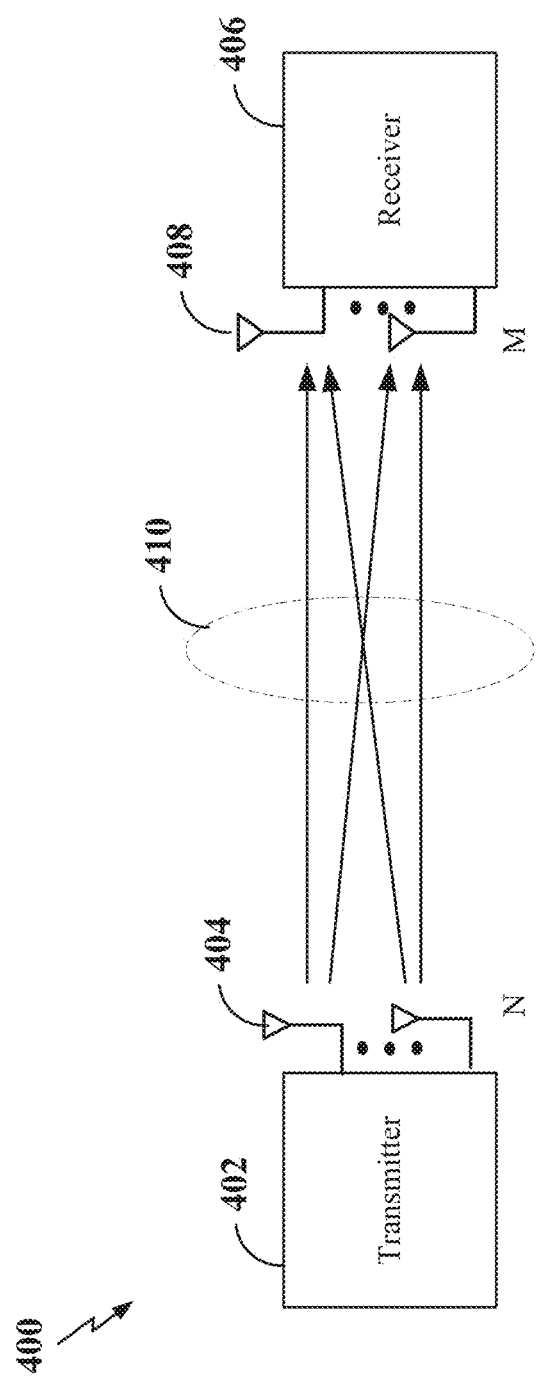
FIG. 4 is a block diagram illustrating an example of a wireless communication system supporting beamforming and/or multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 4 illustrates an example of a wireless communication system 400 supporting beamforming and/or MIMO. In a MIMO system, a transmitter 402 includes multiple transmit antennas 404 (e.g., N transmit antennas) and a receiver 406 includes multiple receive antennas 408 (e.g., M receive antennas). Thus, there are N×M signal paths 410 from the transmit antennas 404 to the receive antennas 408. Each of the transmitter 402 and the receiver 406 may be implemented, for example, within a scheduling entity, a scheduled entity, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (i.e., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the wireless communication system 400 (MIMO system) is limited by the number of transmit or receive antennas 404 or 408, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In one example, as shown in FIG. 4, a rank-2 spatial multiplexing transmission on a 2×2 MIMO antenna configuration will transmit one data stream from each transmit antenna 404. Each data stream reaches each receive antenna 408 along a different signal path 410. The receiver 406 may then reconstruct the data streams using the received signals from each receive antenna 408.

Beamforming is a signal processing technique that may be used at the transmitter 402 or receiver 406 to shape or steer an antenna beam (e.g., a transmit beam or receive beam) along a spatial path between the transmitter 402 and the receiver 406. Beamforming may be achieved by combining the signals communicated via antennas 404 or 408 (e.g., antenna elements of an antenna array module) such that some of the signals experience constructive interference while others experience destructive interference. To create the desired constructive/destructive interference, the transmitter 402 or receiver 406 may apply amplitude and/or phase offsets to signals transmitted or received from each of the antennas 404 or 408 associated with the transmitter 402 or receiver 406.

In 5G New Radio (NR) systems, particularly for above 6 GHz or mmWave systems, beamformed signals may be utilized for most downlink channels, including the physical downlink control channel (PDCCH) and physical downlink shared channel (PDSCH). In addition, broadcast control information, such as the SSB, slot format indicator (SFI), and paging information, may be transmitted in a beam-sweeping manner to enable all scheduled entities (UEs) in the coverage area of a transmission and reception point (TRP) (e.g., a gNB) to receive the broadcast control information. In addition, for UEs configured with beamforming antenna arrays, beamformed signals may also be utilized for uplink channels, including the physical uplink control channel (PUCCH) and physical uplink shared channel (PUSCH).

A base station (e.g., gNB) may generally be capable of communicating with UEs using transmit beams (e.g., downlink transmit beams) of varying beam widths. For example, a base station may be configured to utilize a wider beam when communicating with a UE that is in motion and a narrower beam when communicating with a UE that is stationary. The UE may further be configured to utilize one or more downlink receive beams to receive signals from the base station. In some examples, to select one or more downlink transmit beams and one or more downlink receive beams for communication with a UE, the base station may transmit a reference signal, such as an SSB or CSI-RS, on each of a plurality of downlink transmit beams in a beam-sweeping manner. The UE may measure the reference signal received power (RSRP) on each of the downlink transmit beams using one or more downlink receive beams on the UE and transmit a beam measurement report to the base station indicating the RSRP of each of the measured downlink transmit beams. The base station may then select one or more serving downlink beams (e.g., downlink transmit beams and downlink receive beams) for communication with the UE based on the beam measurement report. The resulting selected downlink transmit beam and downlink receive beam may form a downlink beam pair link. In other examples, when the channel is reciprocal, the base station may derive the particular downlink beam(s) to communicate with the UE based on uplink measurements of one or more uplink reference signals, such as sounding reference signals (SRSs).

Similarly, uplink beams (e.g., uplink transmit beam(s) at the UE and uplink receive beam(s) at the base station) may be selected by measuring the RSRP of received uplink reference signals (e.g., SRSs) or downlink reference signals (e.g., SSBs or CSI-RSs) during an uplink or downlink beam sweep. For example, the base station may determine the uplink beams either by uplink beam management via a SRS beam sweep with measurement at the base station or by downlink beam management via an SSB/CSI-RS beam sweep with measurement at the UE. The selected uplink beam may be indicated by a selected SRS resource (e.g., time-frequency resources utilized for the transmission of a SRS) when implementing uplink beam management or a selected SSB/CSI-RS resource when implementing downlink beam management. For example, the selected SSB/CSI-RS resource can have a spatial relation to the selected uplink transmit beam (e.g., the uplink transmit beam utilized for the PUCCH, SRS, and/or PUSCH). The resulting selected uplink transmit beam and uplink receive beam may form an uplink beam pair link.

Figure 5:
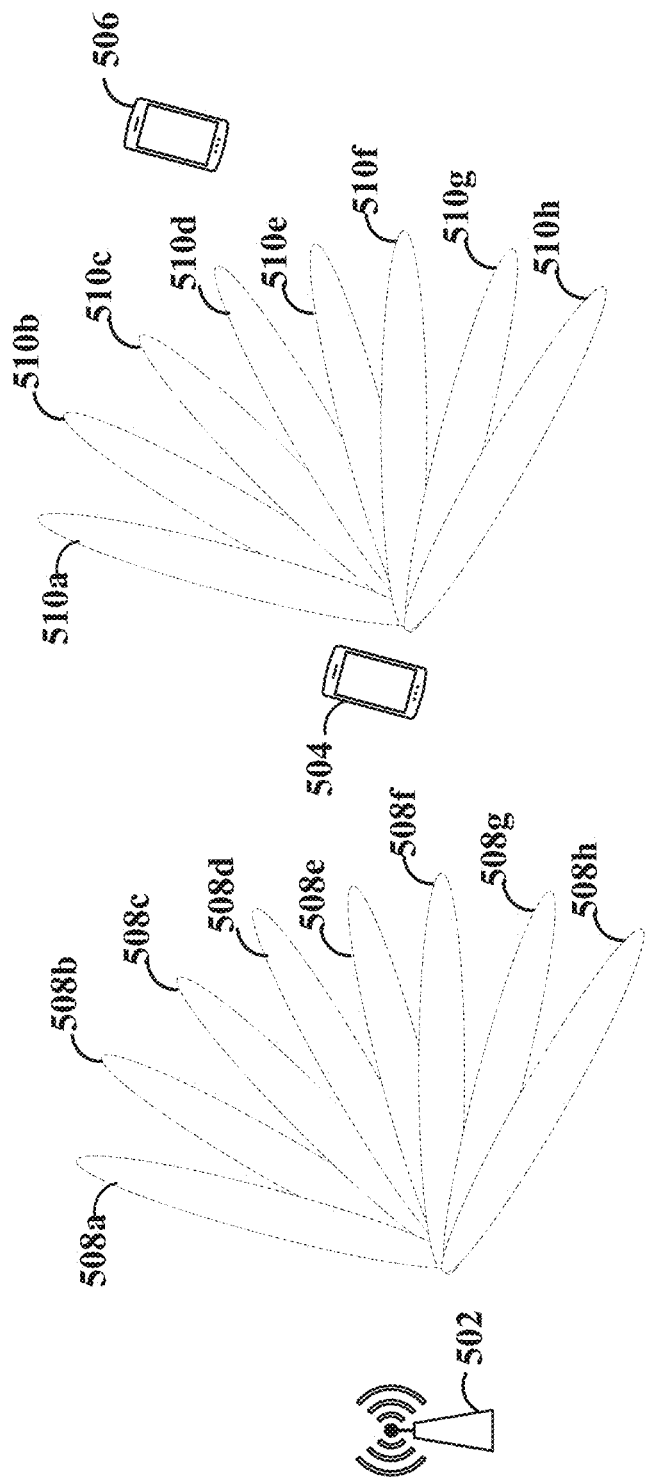
FIG. 5 is a diagram illustrating an example of communication between a radio access network (RAN) node and a wireless communication device using beamforming according to some aspects.

FIG. 5 is a diagram illustrating communication between a base station 504 and a UE 502 using beamformed signals according to some aspects. The base station 504 may be any of the base stations (e.g., gNBs) or scheduling entities illustrated in FIGS. 1 and/or 2, and the UE 502 may be any of the UEs or scheduled entities illustrated in FIGS. 1 and/or 2.

In the example shown in FIG. 5, the base station 504 is configured to generate a plurality of beams 506a-506h, each associated with a different beam direction. In addition, the UE 502 is configured to generate a plurality of beams 508a-508e, each associated with a different beam direction. The base station 504 and UE 502 may select one or more beams 506a-506h on the base station 504 and one or more beams 508a-508e on the UE 502 for communication of uplink and downlink signals therebetween using a downlink beam management scheme and/or an uplink beam management scheme.

In an example of a downlink beam management scheme for selection of downlink beams, the base station 504 may be configured to sweep or transmit on each of a plurality of downlink transmit beams 506a-506h during one or more synchronization slots. For example, the base station 504 may transmit a reference signal, such as an SSB or CSI-RS, on each beam in the different beam directions during the synchronization slot. Transmission of the beam reference signals may occur periodically (e.g., as configured via radio resource control (RRC) signaling by the gNB), semi-persistently (e.g., as configured via RRC signaling and activated/deactivated via medium access control (MAC) control element (MAC-CE) signaling by the gNB), or aperiodically (e.g., as triggered by the gNB via downlink control information (DCI)). It should be noted that while some beams are illustrated as adjacent to one another, such an arrangement may be different in different aspects. For example, downlink transmit beams 506a-506h transmitted during a same symbol may not be adjacent to one another. In some examples, the base station 504 may transmit more or less beams distributed in all directions (e.g., 360 degrees).

In addition, the UE 502 is configured to receive the downlink beam reference signals on a plurality of downlink receive beams 508a-508e. In some examples, the UE 502 searches for and identifies each of the downlink transmit beams 506a-506h based on the beam reference signals. The UE 502 then performs beam measurements (e.g., RSRP, SINR, RSRQ, etc.) on the beam reference signals on each of the downlink receive beams 508a-508e to determine the respective beam quality of each of the downlink transmit beams 506a-506h as measured on each of the downlink receive beams 508a-508e.

The UE 502 can generate and transmit a beam measurement report (e.g., a Layer 1 (L1) measurement report), including the respective beam index and beam measurement of each downlink transmit beam 506a-506h on each downlink receive beam 508a-508e to the base station 504. The base station 504 may then select one or more downlink transmit beams on which to transmit unicast downlink control information and/or user data traffic to the UE 502. In some examples, the selected downlink transmit beam(s) have the highest gain from the beam measurement report. In some examples, the UE 502 can further identify the downlink transmit beams selected by the base station from the beam measurements. Transmission of the beam measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The base station 504 or the UE 502 may further select a corresponding downlink receive beam on the UE 502 for each selected serving downlink transmit beam to form a respective downlink beam pair link (BPL) for each selected serving downlink transmit beam. For example, the UE 502 can utilize the beam measurements to select the corresponding downlink receive beam for each serving downlink transmit beam. In some examples, the selected downlink receive beam to pair with a particular downlink transmit beam may have the highest gain for that particular downlink transmit beam.

In one example, a single downlink transmit beam (e.g., beam 506d) on the base station 504 and a single downlink receive beam (e.g., beam 508c) on the UE may form a single downlink BPL used for communication between the base station 504 and the UE 502. In another example, multiple downlink transmit beams (e.g., beams 506c, 506d, and 506e) on the base station 504 and a single downlink receive beam (e.g., beam 508c) on the UE 502 may form respective downlink BPLs used for communication between the base station 504 and the UE 502. In another example, multiple downlink transmit beams (e.g., beams 506c, 506d, and 506e) on the base station 504 and multiple downlink receive beams (e.g., beams 508c and 508d) on the UE 502 may form multiple downlink BPLs used for communication between the base station 504 and the UE 502. In this example, a first downlink BPL may include downlink transmit beam 506c and downlink receive beam 508c, a second downlink BPL may include downlink transmit beam 508d and downlink receive beam 508c, and a third downlink BPL may include downlink transmit beam 508e and downlink receive beam 508d.

When the channel is reciprocal, the above-described downlink beam management scheme may also be used to select one or more uplink BPLs for uplink communication from the UE 502 to the base station 504. For example, the downlink BPL formed of beams 506d and 508e may also serve as an uplink BPL. Here, beam 508c is utilized as an uplink transmit beam, while beam 506d is utilized as an uplink receive beam.

In an example of an uplink beam management scheme, the UE 502 may be configured to sweep or transmit on each of a plurality of uplink transmit beams 508a-508e. For example, the UE 502 may transmit a SRS on each beam in the different beam directions. In addition, the base station 504 may be configured to receive the uplink beam reference signals on a plurality of uplink receive beams 506a-506h. In some examples, the base station 504 searches for and identifies each of the uplink transmit beams 508a-508e based on the beam reference signals. The base station 504 then performs beam measurements (e.g., RSRP, SINR, RSRQ, etc.) on the beam reference signals on each of the uplink receive beams 506a-506h to determine the respective beam quality of each of the uplink transmit beams 508a-508e as measured on each of the uplink receive beams 506a-506h.

The base station 504 may then select one or more uplink transmit beams on which the UE 502 will transmit unicast downlink control information and/or user data traffic to the base station 504. In some examples, the selected uplink transmit beam(s) have the highest gain. The base station 504 may further select a corresponding uplink receive beam on the base station 504 for each selected serving uplink transmit beam to form a respective uplink beam pair link (BPL) for each selected serving uplink transmit beam. For example, the base station 504 can utilize the beam measurements to select the corresponding uplink receive beam for each serving uplink transmit beam. In some examples, the selected uplink receive beam to pair with a particular uplink transmit beam may have the highest gain for that particular uplink transmit beam.

The base station 504 may then notify the UE 502 of the selected uplink transmit beams. For example, the base station 504 may provide the SRS resource identifiers (IDs) identifying the SRSs transmitted on the selected uplink transmit beams. In some examples, the base station 504 may apply each selected uplink transmit beam (and corresponding uplink receive beam) to an uplink signal (e.g., PUCCH, PUSCH, SRS, etc.) and transmit the respective SRS resource IDs associated with the selected uplink transmit beams applied to each uplink signal to the UE 502. When the channel is reciprocal, the above-described uplink beam management scheme may also be used to select one or more downlink BPLs for downlink communication from the base station 504 to the UE 502. For example, the uplink BPLs may also be utilized as downlink BPLs.

Figure 6:
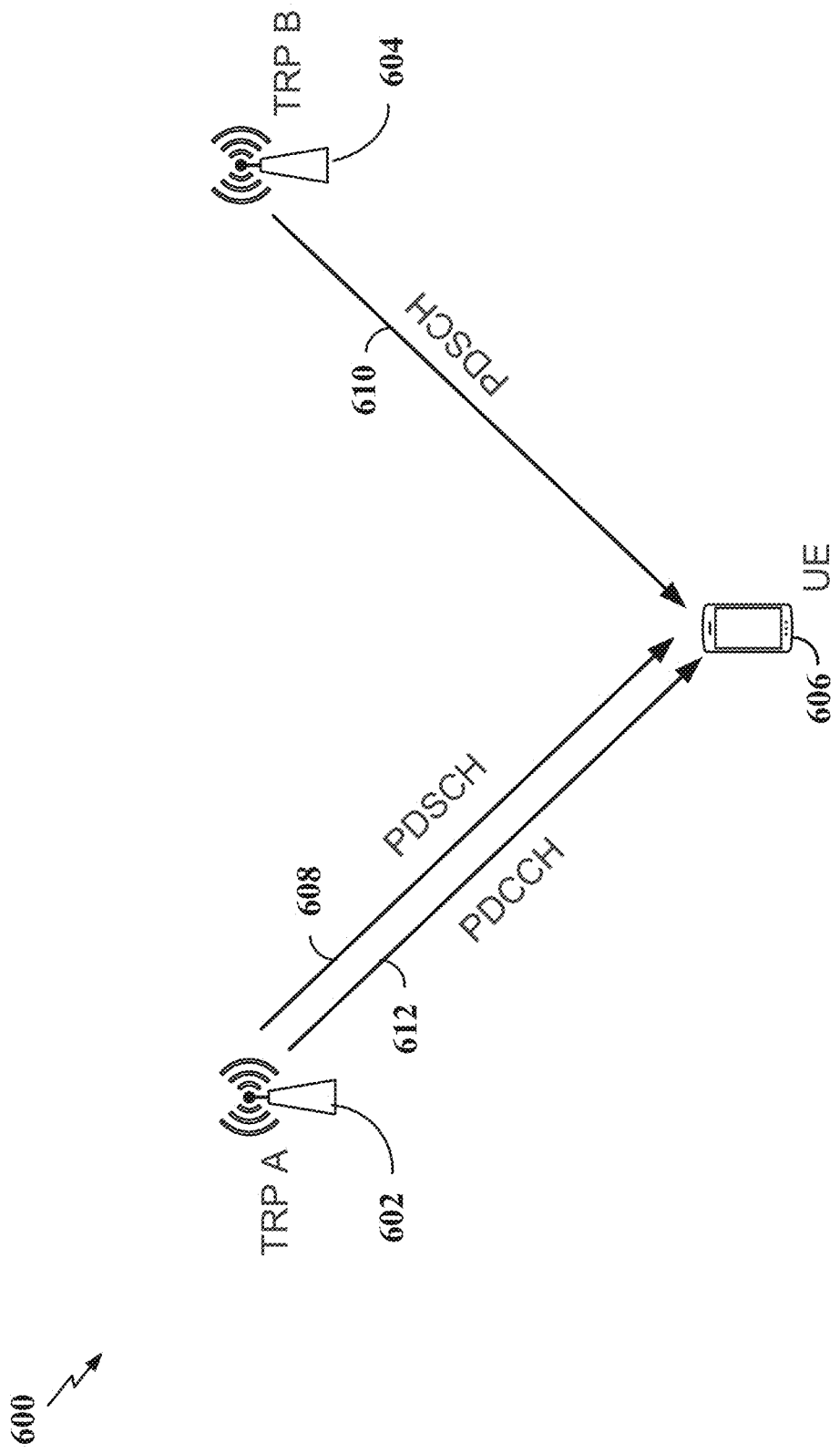
FIG. 6 illustrates an example radio access network (RAN) including multiple transmission and reception points (TRPs) according to aspects of the present disclosure.

FIG. 6 illustrates an example radio access network (RAN) 600 including multiple transmission and reception points (TRPs) according to aspects of the present disclosure. As illustrated, the RAN 600 includes at least a first TRP 602 (TRP A) and a second TRP 604 (TRP B) that may be in communication with a UE 606. The combination of the TRPs 602 and 604 may constitute a single gNB or a serving cell in some aspects. Each TRP 602 and 604 may transmit data to the UE 606 over a scheduled physical downlink shared channel (PDSCH) shown transmitted at 608 and 610 from each TRP. In this example, only one TRP (e.g., a single-DCI), however, is used to schedule a multi-TCI transmission in a physical downlink control channel (PDCCH) 612. When a single DCI is used to schedule a multi-TCI transmission, the TCI field in the DCI may be configured to indicate two (2) TCI states for the purpose of receiving the scheduled PDSCH at the UE 606 from both TRP 602 and TRP 604. Stated another way, each TCI code point in a DCI can correspond to either one or two TCI states dependent on whether or not the RAN is a multi-TRP environment, as will be explained later with reference to FIG. 7.

The RAN 600 may activate and deactivate the configured TCI states for a codepoint of the DCI TCI field for the PDSCH of a serving cell by sending TCI States Activation/Deactivation for PDSCH MAC CE. It is noted that in the context of a multi-TRP environment such as shown in FIG.

6, the TCI States Activation/Deactivation for PDSCH is performed where two TCI states may be indicated in the MACE-CE of a serving cell. The use of a TCI States Activation/Deactivation for PDSCH is particularly useful for the case of Enhanced Mobile Broadband (eMBB) in 5G NR, but the usefulness is not limited to just eMBB.

Figure 7:
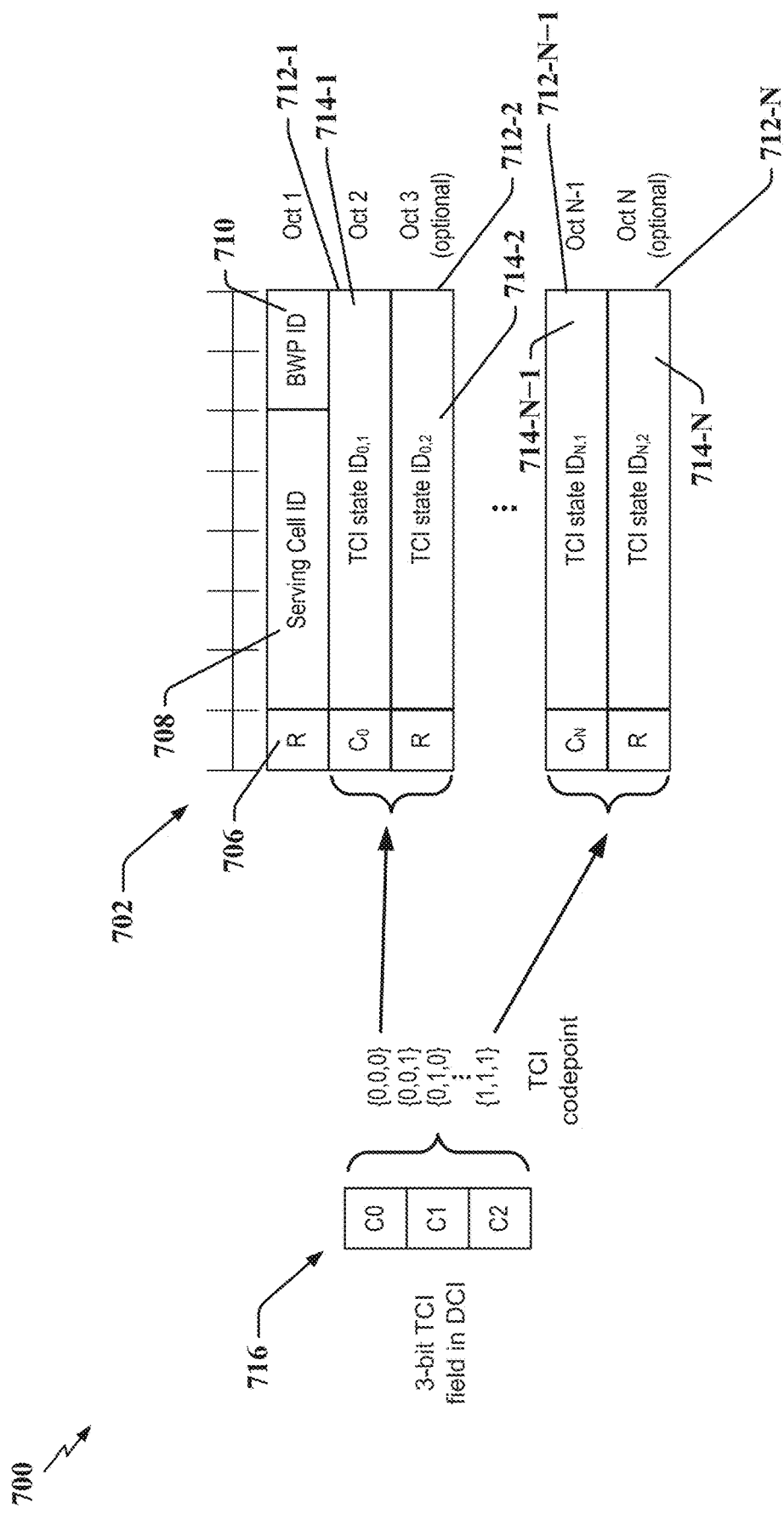
FIG. 7 illustrates an example of a medium access control (MAC) control element (MAC-CE) and downlink control information (DCI) configuration for indicating transmission control indicator (TCI) States activation/deactivation according to some aspects.

FIG. 7 illustrates an example 700 of a correspondence of DCI bits (codepoints) and a MAC-CE for TCI states activation/deactivation in a multi-TRP environment such as that illustrated in FIG. 6. As shown, a MAC-CE 702, which is a TCI States Activation/Deactivation for PDSCH MAC-CE and is used for indicating the TCI states activation/deactivation, has a series or string of octets of bits. The MAC-CE 702 may include a reserved bit field 706, serving cell identifier (ID) field 708 (5 bits), and bandwidth part (BWP) ID bit field 710 (2 bits). The serving cell ID field 708 indicates the identity of the Serving Cell for which the MAC CE applies. The BWP ID field 710 indicates a DL BWP for which the MAC CE applies as the codepoint of a DCI bandwidth part indicator field as specified in 3GPP TS 38.212, for example.

The MAC-CE also contains an N number of TCI fields 712 (shown as 712-1 through 712-N), which include a respective TCI state ID 714 (shown as 714-1 through 714-N) mapped to the TCI codepoints of a DCI TCI field 716, which in this case is a three (3) bit TCI field (bits C0, C1, and C2) where the maximum size of the codepoint is eight, but the disclosure is not limited to such. The TCI state IDs 714 in the TCI fields 712 indicate the activation of corresponding TCI states. TCI state IDs 714 that are not listed in the TCI fields 712 may correspond to TCI states that are deactivated. In other words, the MAC-CE 702 may include activated TCI states and exclude deactivated TCI states.

In an example, a DCI codepoint for a TCI States Activation/Deactivation may correspond to two TCI ID states. For example, the codepoint {0,0,0} may correspond to TCI state $ID_{0,1}$ 714-1 and TCI state $ID_{0,2}$ 714-2 as illustrated in FIG. 7. Thus, in an aspect, each of the codepoints of the DCI TCI field may correspond to two TCI states, which schedules the PDSCH from multiple TRPs (e.g., from TRP 602 and TRP 604 in FIG. 6).

Additionally, it is noted that a UE, such as UE 606 or any of the UEs disclosed herein, is RRC configured with a list of up to an M number of candidate TCI states for at least the purpose of quasi co-located (QCL) indication. The number M may typically be M=64 or M=128. Each TCI state may be one reference signal (RS) set for the various different QCL types; i.e., DL RS: SSB and AP/P/SP-CSI-RS/TRS. Further, the MAC-CE (e.g., 702), is used to select up to $L=2^N$ TCI states out of the M number of TCI states for the PDSCH QCL indication, where N is the number of bits that the DCI uses to dynamically indicate the TCI state for the PDSCH transmission. Thus, from the example of FIG. 7 as mentioned earlier, the L number of selectable TCI states is equal to eight (8); i.e., $L=2^3=8$.

Figure 8:
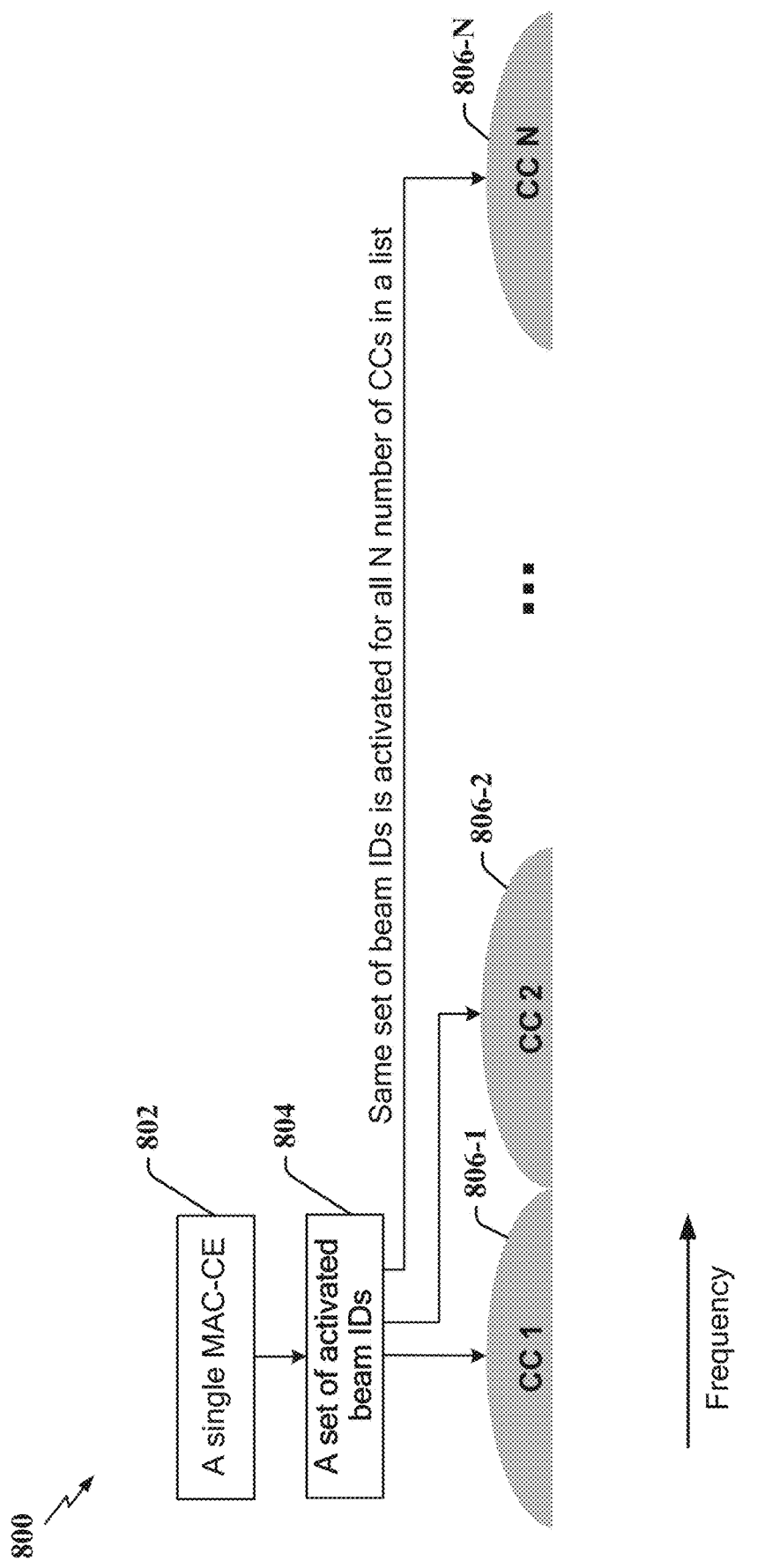
FIG. 8 illustrates an example of a multi-component carrier transmission according to some aspects.

FIG. 8 is a diagram illustrating an example 800 of a format for a multi-CC transmission When carrier aggregation is configured, one or more of the secondary component carriers may be activated or added to the primary component carrier to form the serving component carriers serving the UE (e.g., UE 606). In some examples, the base station (e.g., TRP 602 or TRP 604) may add or remove one or more of the secondary component carriers to improve reliability of the connection to the UE 606 and/or increase the data rate. The primary component carrier may be changed upon a handover to another base station or another primary component carrier.

In some examples, the primary component carrier may be a low band component carrier, and the secondary component carriers may be high band component carriers. A low band (LB) component carrier has a frequency band lower than that of the high band component carrier. For example, the high band component carrier may use a mmWave component carrier, and the low band component carrier may use a component carrier in a band (e.g., sub-6 GHz band) lower than mmWave. In general, a mmWave component carrier can provide greater bandwidth than a low band component carrier.

According to further aspects, in order to save overhead and potential different activation times of multiple MAC-CEs using respective MAC-CEs, a single MAC-CE can be used to activate a same set of beam IDs for a multiple CC scenario. As an illustration, FIG. 8 shows that the application of a MAC-CE 802 will activate a set of beam IDs 804 in a multi-CC system. The set of activated beams IDs 804 is configured to be activated for all of N number of CCs 806-1 through 806-N in a list of CC carriers.

In the configuration using a single MAC-CE for activation of a set of beam IDs, a set of PDSCH TCI state IDs activated by the MAC CE can be applied to all BWPs in the CCs in the applicable CC list. The TCI States Activation/Deactivation for the UE-specific PDSCH MAC CE may be accomplished according to section 6.1.3.14 as discussed in 3GPP TS 38.321. Additionally, a TCI state ID activated by a MAC-CE can be applied to all CORESET(s) with a same CORESET ID for all BWPs in the CCs in the applicable CC list. This may be accomplished according to section 6.1.3.15 in 3GPP TS 38.321. Still further, sounding resource signal (SRS) spatial relation information activated by the MAC-CE can be applied to the SRS resource(s) with a same resource ID for all BWPs in the CCs in the applicable CC list. In this case, a serving cell set based on SRS Spatial Relation Indication (SRI) MAC CE as set forth in section 6.1.3.29 in 3GPP TS 38.321 may be utilized.

In a multi-CC system with simultaneous TCI state activation, TCI States Activation/Deactivation for PDSCH MAC CE may be accomplished using in a single TRP system. In some aspects disclosed herein, simultaneous TCI state activation for a multi-CC system may also be applied in a multi-TRP system, such as the RAN 600 in FIG. 6 using a single DCI operation such as by using an Enhanced TCI States Activation/Deactivation for a UE-specific PDSCH MAC CE.

In one example, a RAN (e.g., a TRP in the RAN) may configure (such a via RRC signaling from the network to one or more UE) the CC list (also referred to as a CC ID list) to remove a select or specific CC (or also referred to as CC ID herein) before sending the TCI States activation/deactivation for the PDSCH MAC-CE with this specific CC ID (or reconfigure the CC ID list in the case of an extant CC ID list). In further aspects, when a UE receives the TCI States activation/deactivation MAC-CE, the UE may be configured to apply the TCI state activation/deactivation may to the specific or select CC ID only, according to one example. Still further, the UE receiving this TCI state activation/deactivation MAC-CE will not apply the TCI state activation/deactivation to the other CC IDs in the CC ID list apart from the select CC ID. In still another aspect, when the UE receives the TCI States activation/deactivation for the PDSCH MAC CE and the select or specific CC ID is in the CC-list, the UE may be configured to ignore this MAC CE. In particular, the inclusion of the specific CC ID would indicate that it is an error case for this UE as the network should have removed the CC from the CC list before sending this MAC CE, as indicated from the RRC configuration of the CC list. In still one other aspect, it is noted that in this configuration, the UE may be configured to apply the TCI State activation if it is determined that the select CC in not in the CC list.

In another example, a RAN (e.g., a TRP in the RAN) configures the CC ID list to specifically include the select or specific CC ID before the RAN sends the TCI States activation/deactivation for a PDSCH MAC CE with this specific CC ID. When a UE receives this MAC CE, the UE may be configured to respond in at least one of two options. In a first option, if the UE receives the TCI States activation/deactivation for the PDSCH MAC CE and the indicated CC is in the CC-list, the UE may be configured to only apply the TCI state activation on the indicated or select CC. According to another option, if the UE receives the TCI States activation/deactivation for the PDSCH MAC CE and the indicated CC is in the CC-list, the UE may be configured to apply the TCI state activation on all the CC's in the CC list.

Figure 9:
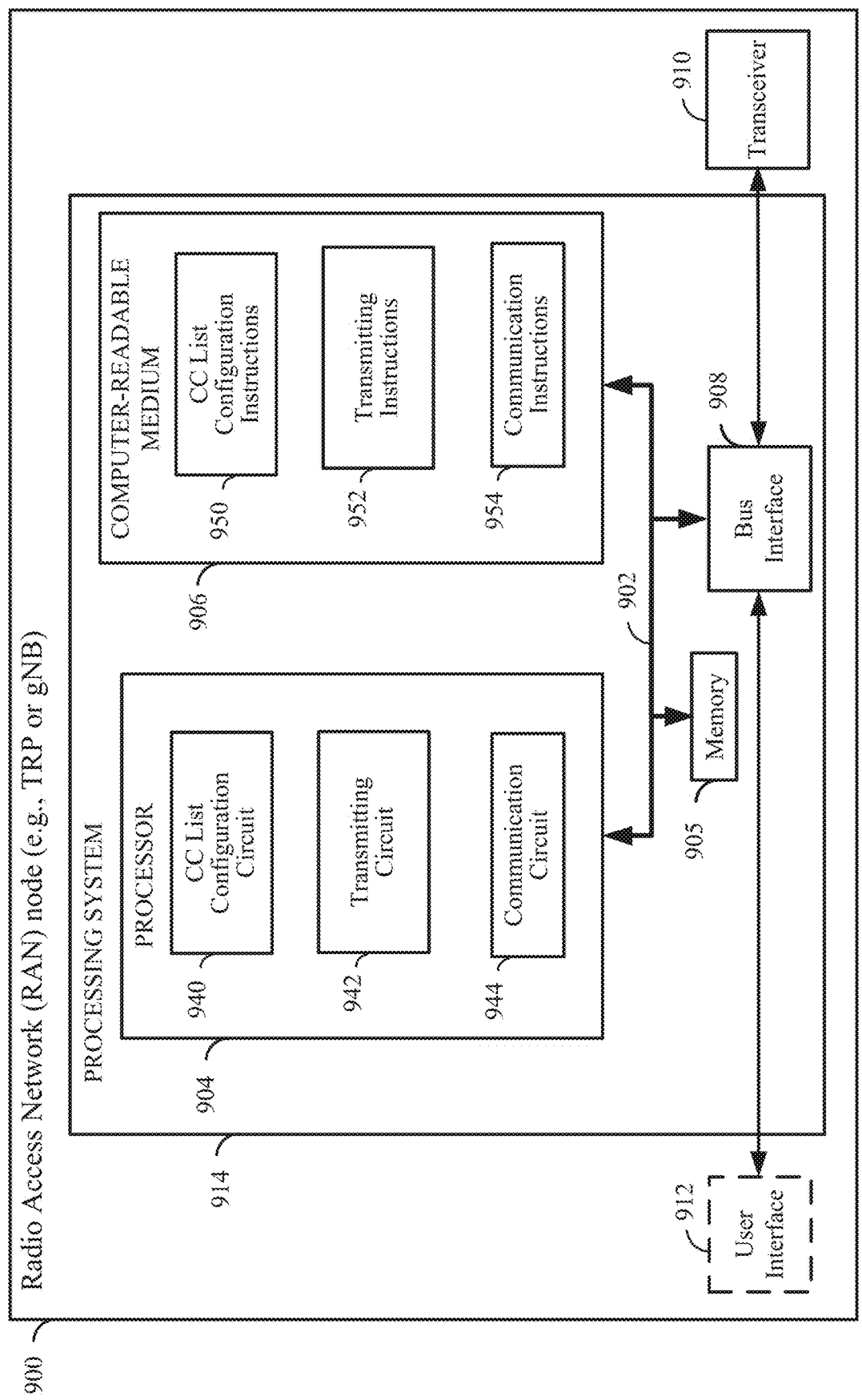
FIG. 9 is a block diagram illustrating an example of a hardware implementation for a radio access network (RAN) node or entity employing a processing system according to some aspects.

FIG. 9 is a block diagram illustrating an example of a hardware implementation for a radio access network (RAN) node employing a processing system 914. For example, the RAN node 900 may be any of the base stations (e.g., gNB) or TRPs illustrated in any one or more of FIGS. 1-6 and 9.

The RAN node 900 may be implemented with a processing system 914 that includes one or more processors 904. Examples of processors 904 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the RAN node 900 may be configured to perform any one or more of the functions described herein. That is, the processor 904, as utilized in a RAN node 900, may be used to implement any one or more of the processes described herein. The processor 904 may in some instances be implemented via a baseband or modem chip and in other implementations, the processor 904 may itself comprise a number of devices distinct and different from a baseband or modem chip (e.g., in such scenarios is may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 914 may be implemented with a bus architecture, represented generally by the bus 902. The bus 902 may include any number of interconnecting buses and bridges depending on the specific application of the processing system 914 and the overall design constraints. The bus 902 communicatively couples together various circuits including one or more processors (represented generally by the processor 904), and computer-readable media (represented generally by the computer-readable storage medium 906). The bus 902 may also link various other circuits such as timing sources, peripherals, voltage regulators, and power management circuits, which are well known in the art, and therefore, will not be described any further. A bus interface 908 provides an interface between the bus 902 and a transceiver 910. The transceiver 910 provides a means for communicating with various other apparatus over a transmission medium (e.g., air interface). A user interface 912 (e.g., keypad, touchpad, display, speaker, microphone, etc.) may also be provided.

The processor 904 is responsible for managing the bus 902 and general processing, including the execution of software stored on the computer-readable storage medium 906. The software, when executed by the processor 904, causes the processing system 914 to perform the various functions described herein for any particular apparatus. The computer-readable storage medium 906 may also be used for storing data that is manipulated by the processor 904 when executing software.

One or more processors 904 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 906.

The computer-readable storage medium 906 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 906 may reside in the processing system 914, external to the processing system 914, or distributed across multiple entities including the processing system 914. The computer-readable storage medium 906 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 904 may include circuitry configured for various functions. For example, the processor 904 may include a CC list or CC ID list configuration circuitry 940 for configuring a component carrier list. In one example, the CC ID list configuration circuitry 940 configures (or reconfigures) a component carrier (CC) list to exclude a select CC ID prior to sending a transmission configuration indicator (TCI) state activation within control signaling to at least one user equipment (UE) in the RAN. In another example, the CC ID list configuration circuitry 940 configures the component carrier (CC) list of component carrier IDs to include a select CC ID prior to sending the TCI state activation within control signaling to at least one user equipment (UE) in the RAN. The CC ID list configuration circuitry 940 may include one or more hardware components that provide the physical structure that performs various processes related to configuring a CC list or CC ID list as described herein. The CC ID list configuration circuitry 940 may further include one or more hardware components that provide the physical structure that performs various processes related to initiating radio resource control (RRC) messaging for configuring one or more UEs in the RAN with CC ID list as described herein. In some examples, the CC ID list configuration circuitry 940 may include functionality for a means for determining and configuring a CC ID list, including the circuitry 940, as well as memory 905 and/or medium 906 in other examples. The CC ID list configuration circuitry 940 may further be configured to execute CC ID list configuration instructions 950 stored in the computer-readable storage medium 906 to implement any of the one or more of the functions described herein.

The processor 904 may also include transmitting circuitry 942 configured to transmit, via the transceiver 910, the RRC messaging to a user equipment (UE) to configure the CC list for at least one UE in the RAN. Additionally, the transmitting circuitry 942 may be configured to transmit, via transceiver 910, the TCI states activation/deactivation MAC-CE for a select CC ID, as discussed above. In an aspect, the transmitting circuitry 942 may be configured to cause transmission of the TCI states activation/deactivation MAC-CE after the RRC messaging has been sent to the UE. Further, transmitting circuitry 942 may be configured to transmit DCI including the bit TCI field in DCI as discussed above in connection with FIG. 6. The transmitting circuitry 942 may include one or more hardware components that provide the physical structure that performs various processes related to RRC configuration and MAC-CE and DCI transmissions as described herein. In some examples, the transmitting circuitry 942 may include functionality for a means for transmitting, including the circuitry 942, as well as transceiver 910 in other examples. In yet further aspects, the transmitting circuitry 942 may further be configured to execute transmitting instructions 952 stored in the computer-readable storage medium 906 to implement any of the one or more of the functions described herein.

The processor 904 may further include communication circuitry 944 configured to utilize a communication link and communicate with a user equipment using access communication by aggregating at least two of a plurality of access component carriers for the multi-component carrier communication. The communication circuitry 944 may further be configured to execute communication instructions 954 stored in the computer-readable storage medium 906 to implement any of the one or more of the functions described herein.

Figure 10:
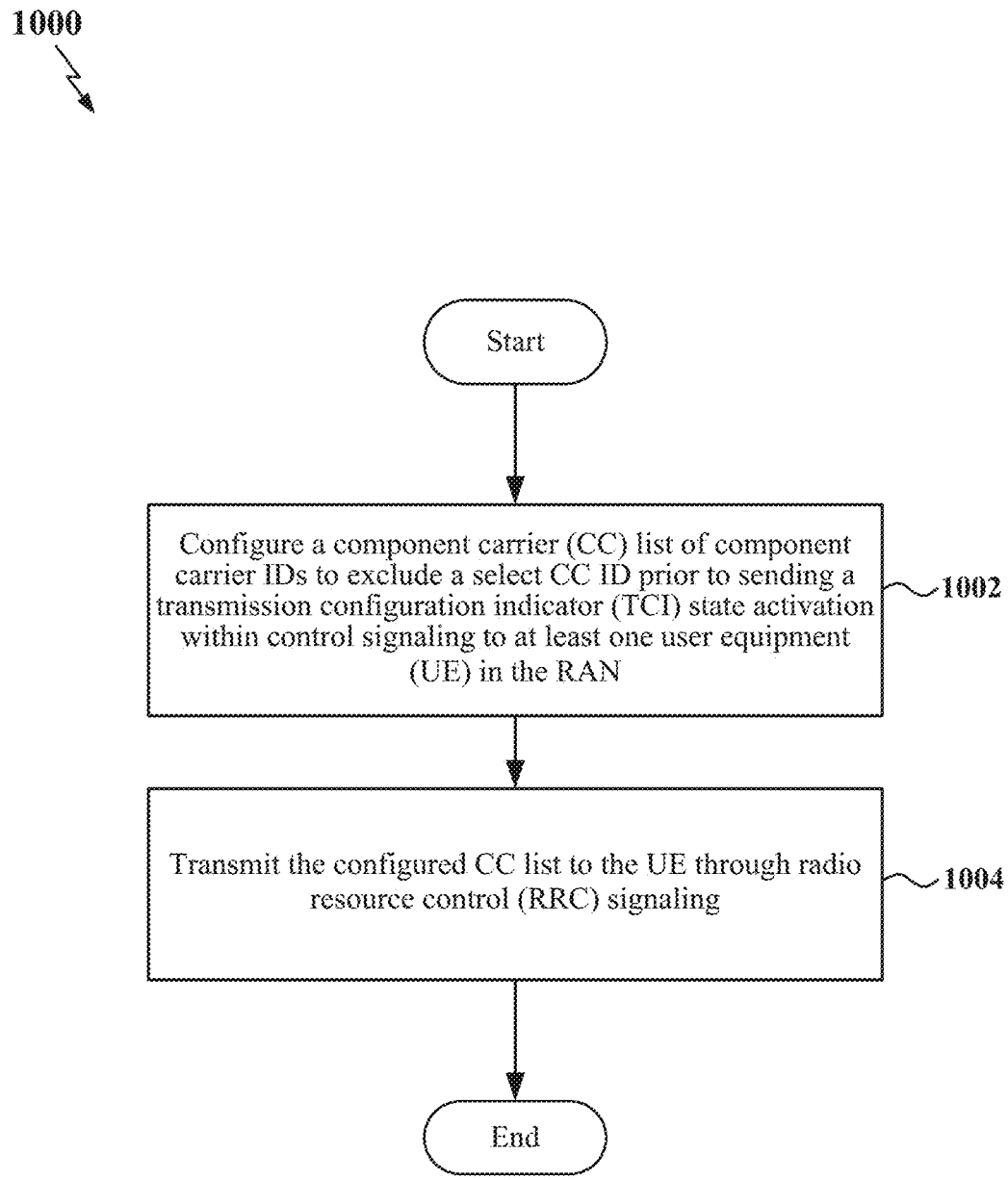
FIG. 10 is a flow chart of a method for wireless communication in a radio access network according to some aspects.

FIG. 10 is a flow chart 1000 of a method for generating and transmitting transmission configuration indicator states (TCI-states) or spatial relation indications (SRIs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the RAN node 900, as described above and illustrated in FIG. 9, by a processor or processing system, or by any suitable means for carrying out the described functions.

At block 1002, the RAN node 900, for example, may configure a component carrier (CC) list of component carrier IDs to exclude a specific or select CC ID prior to sending a transmission configuration indicator (TCI) state activation within control signaling to at least one user equipment (UE) in the RAN. The control signaling may include a single media access control (MAC) control element (MAC-CE) that is configured to communicate the TCI state activation to the at least one UE for a set of beam IDs shared by multiple component carriers used by the at least one UE. In some aspects, the processes of block 1002 may be implemented in any of the RAN nodes, base stations, scheduling entities, or gNBs discussed herein with regard to the FIGS. 1-6. In other aspects, the processes of block 1002 may be implemented by circuitry 914, processor 904, and/or circuitry 940 as shown in FIG. 9.

Method 1000 also includes transmitting the configured CC list to the UE through radio resource control (RRC) signaling as shown at block 1004. In other examples, the RRC may be effectuated by one TRP in a multi-TRP system or configuration such as that illustrated in FIG. 6. In further aspects, it is noted that the MAC-CE signaling is configured such the TCI state activation is configured to signal to the at least one UE that the TCI state activation applies to the select CC ID that is excluded from the CC list, such as through the DCI TCI configuration. Of further note, the MAC-CE signaling transmitted by the RAN node may be configured as a TCI States Activation/Deactivation signal where each codepoint in a TCI field in DCI may map to or indicate at least two different TCI state IDs within the MAC-CE, where each TCI state ID corresponds to a respective transmission and reception point (TRP) and an associated scheduled physical downlink shared channel PDSCH.

Figure 11:
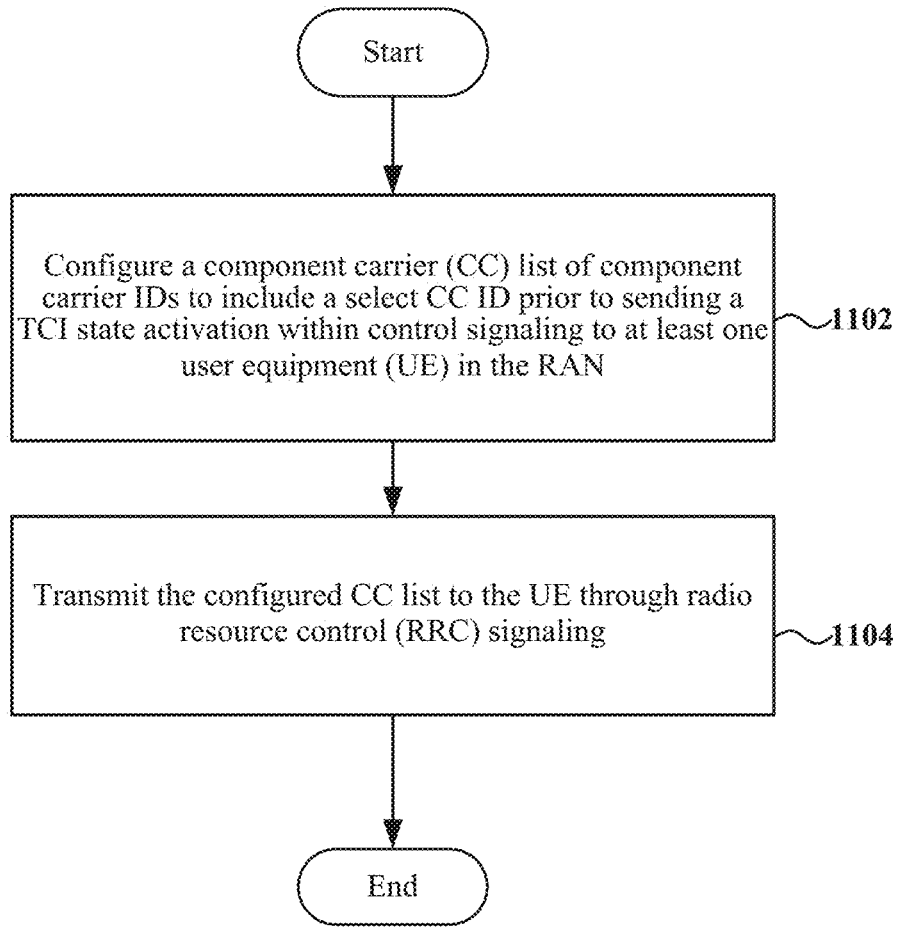
FIG. 11 is a flow chart of another method for wireless communication in a radio access network according to some aspects.

FIG. 11 is a flow chart 1100 of a method for generating and transmitting transmission configuration indicator states (TCI-states) or spatial relation indications (SRIs) to utilize for multi-component communication according to some aspects. As described below, some or all illustrated features may be omitted in a particular implementation within the scope of the present disclosure, and some illustrated features may not be required for implementation of all aspects. In some examples, the method may be performed by the RAN node 900, as described above and illustrated in FIG. 9, by a processor or processing system, or by any suitable means for carrying out the described functions.

At block 1102, the RAN node 900, for example, may configure a component carrier (CC) list of component carrier IDs to include a specific or select CC ID prior to sending a transmission configuration indicator (TCI) state activation within control signaling to at least one user equipment (UE) in the RAN. The control signaling may include a single media access control (MAC) control element (MAC-CE) that is configured to communicate the TCI state activation to the at least one UE for a set of beam IDs shared by multiple component carriers used by the at least one UE. In some aspects, the processes of block 1102 may be implemented in any of the RAN nodes, base stations, scheduling entities, or gNBs discussed herein with regard to the FIGS. 1-6. In other aspects, the processes of block 1102 may be implemented by circuitry 914, processor 904, and/or circuitry 940 as shown in FIG. 9.

Method 1100 also includes transmitting the configured CC list to the UE through radio resource control (RRC) signaling as shown at block 1104. In other examples, the RRC may be effectuated by one TRP in a multi-TRP system or configuration such as that illustrated in FIG. 6. In further aspects, it is noted that the MAC-CE signaling is configured such the TCI state activation is configured to signal to the at least one UE that the TCI state activation applies to the select CC ID that is included in the CC list, such as through the DCI TCI configuration. Of further note, the MAC-CE signaling transmitted by the RAN node may be configured as a TCI States Activation/Deactivation signal where each codepoint in a TCI field in DCI may map to or indicate at least two different TCI state IDs within the MAC-CE, where each TCI state ID corresponds to a respective transmission and reception point (TRP) and an associated scheduled physical downlink shared channel PDSCH.

Figure 12:
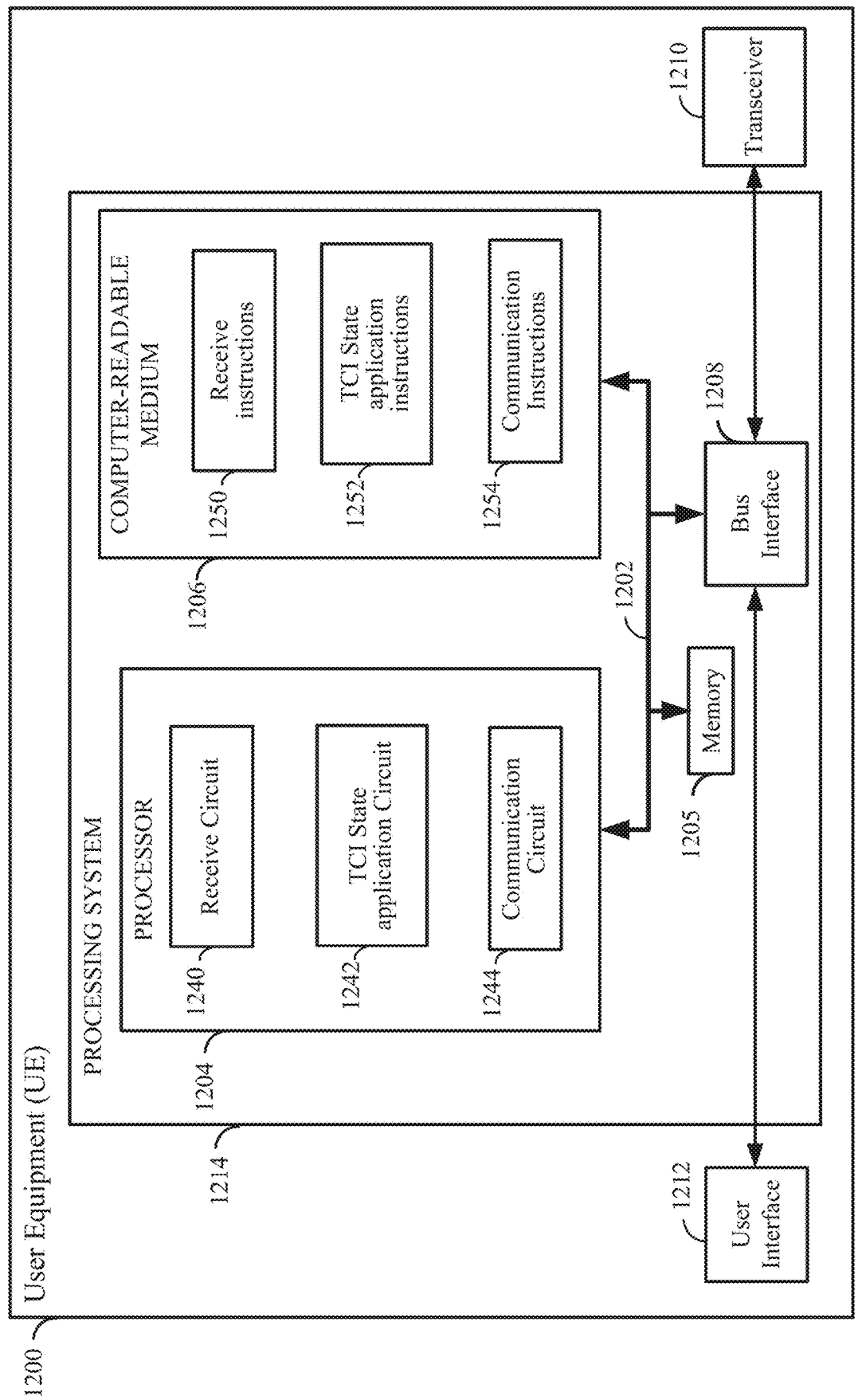
FIG. 12 is a block diagram illustrating an example of a hardware implementation for a wireless communication device employing a processing system according to some aspects.

FIG. 12 is a block diagram illustrating an example of a hardware implementation for a wireless communication device or UE 1200 employing a processing system 1214 according to some aspects. For example, the wireless communication device 1200 may correspond to any of the UEs shown and described above in any one or more of FIGS. 1-6, for example.

In accordance with various aspects of the disclosure, an element, or any portion of an element, or any combination of elements may be implemented with a processing system 1214 that includes one or more processors 1204. The processing system 1214 may be substantially the same as the processing system 914 illustrated in FIG. 9, including a bus interface 1208, a bus 1202, a processor 1204, and a computer-readable storage medium 1206. Furthermore, the UE 1200 may include a user interface 1212 and a transceiver 1210 substantially similar to those described above in FIG. 9. That is, the processor 1204, as utilized in a UE 1200, may be used to implement any one or more of the processes described herein.

In some aspects of the disclosure, the processor 1204 may include circuitry configured for various functions. For example, the processor 1204 may include receive circuitry 1240 configured to receive, from a RAN node (e.g., base station, gNB, and/or TRP) and via the transceiver 1210, signaling indicating one or more transmission configuration indicator states (TCI-states) for multi-component carrier communication and multi-TRP communication as well. The signaling may include receiving control signaling including at least one TCI state activation related to at least one select CC ID. The receive circuitry 1240 may include one or more hardware components that provide the physical structure that performs various processes related to RRC configuration and receiving MAC-CE and DCI transmissions as described herein. In some examples, the receive circuitry 1240 may include functionality for a means for receiving, including the circuitry 1240, as well as transceiver 1210 in other examples. In other aspects, receive circuitry 1240 may be configured to execute receiving instructions 1250 stored in the computer-readable storage medium 1206 to implement any of the one or more of the functions described herein.

In some aspects of the disclosure, the processor 1204 may include TCI state application circuitry 1242 configured to for determining whether the at least one select CC ID is a part of a preconfigured CC list that is configured by the RAN. In this case, The signaling may receiving MAC-CE transmissions as described herein. In some examples, the TCI state application circuitry 1242 may include functionality for a means for receiving, including the circuitry 1242, as well as transceiver 1210 in other examples. In other aspects, TCI state application circuitry 1242 may be configured to execute receiving instructions 1252 stored in the computer-readable storage medium 1206 to implement any of the one or more of the functions described herein.

In still other aspects, TCI state application circuitry 1242 may be configured to apply the at least one TCI state activation for a CC corresponding to the at least one select CC ID received in the control signaling when the at least one select CC ID is determined to be a part of a preconfigured CC list. In other aspects, the TCI state application circuitry 1242 may be configured to apply the at least one TCI state activation for all CCs in the preconfigured CC list when the at least one select CC ID received in the control signaling is determined to be a part of a preconfigured CC list. In yet other examples, TCI state application circuitry 1242 may be configured to ignore or disregard the at least one TCI state activation when the at least one select CC ID is determined to be a part of a preconfigured CC list.

The processor 1204 may further include communication circuitry 1244 configured to utilize a communication link and communicate with a base station using access communication by aggregating at least two of the plurality of access component carriers for the multi-component carrier communication. The communication circuitry 1244 may further be configured to execute communication instructions 1254 stored in the computer-readable storage medium 1206 to implement any of the one or more of the functions described herein.

Figure 13:
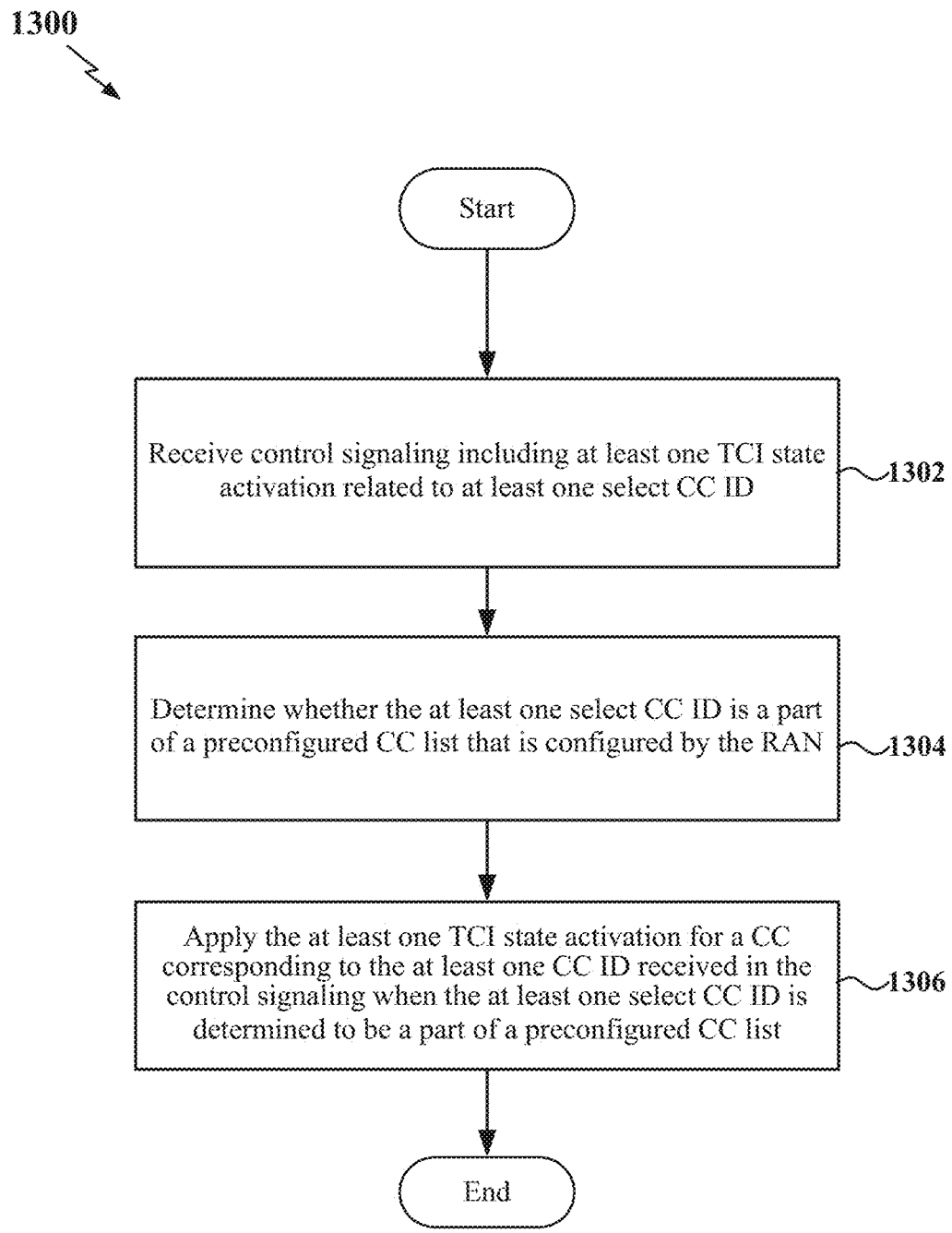
FIG. 13 is a flow chart of a method for receiving and updating transmission configuration indicator states (TCI-states) to utilize for multi-component communication according to some aspects.

FIG. 13 is a flow chart of a method 1300 for receiving and updating TCI-states for multi-component communication according to some aspects. In some examples, the method 1300 may be performed by the UE 1200, as described above and illustrated in FIG. 12, by a processor or processing system, or by any suitable means for carrying out the described functions.

At block 1302, the UE 1200 may receive control signaling including at least one TCI state activation related to at least one select CC ID. This process in block 1302 may be implemented by circuit 1240, and/or transceiver 1210 as an example. Furthermore, the control signal may include a MAC-CE as discussed above.

Method 1300 further includes that the UE 1200 may determine whether the at least one select CC ID is a part of a preconfigured CC list that is configured by the RAN as shown at block 1304. Further, method 1300 includes applying the at least one TCI state activation for a CC corresponding to the at least one select CC ID received in the control signaling when the at least one select CC ID is determined to be a part of a preconfigured CC list as shown in block 1306.

Figure 14:
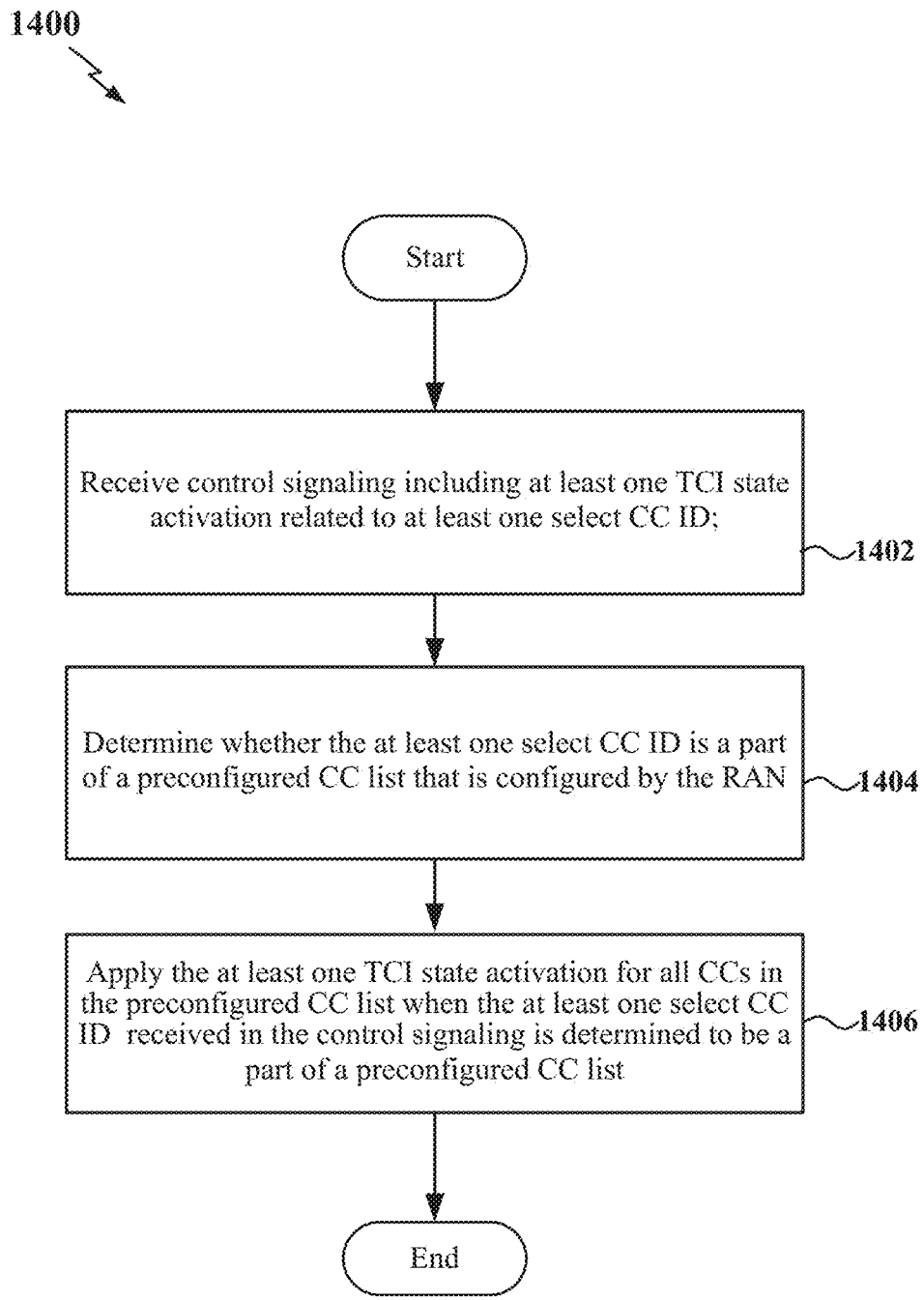
FIG. 14 is another flow chart of a method for receiving and updating transmission configuration indicator states (TCI-states) to utilize for multi-component communication according to some aspects.

FIG. 14 is a flow chart 1400 of a method for receiving and updating TCI-states for multi-component communication according to some aspects. In some examples, the method 1400 may be performed by the UE 1200, as described above and illustrated in FIG. 12, by a processor or processing system, or by any suitable means for carrying out the described functions.

At block 1402, UE 1200 may be configured to receive control signaling including at least one TCI state activation related to at least one select CC ID. This process in block 1402 may be implemented by circuit 1240, and/or transceiver 1210 as an example. Furthermore, the control signal may include a MAC-CE as discussed above.

Method 1400 further includes that the UE 1200 may determine whether the at least one select CC ID is a part of a preconfigured CC list that is configured by the RAN as shown at block 1404. Further, method 1400 includes applying the at least one TCI state activation for all CCs in the preconfigured CC list when the at least one select CC ID received in the control signaling is determined to be a part of a preconfigured CC list as shown at block 1406.

Figure 15:
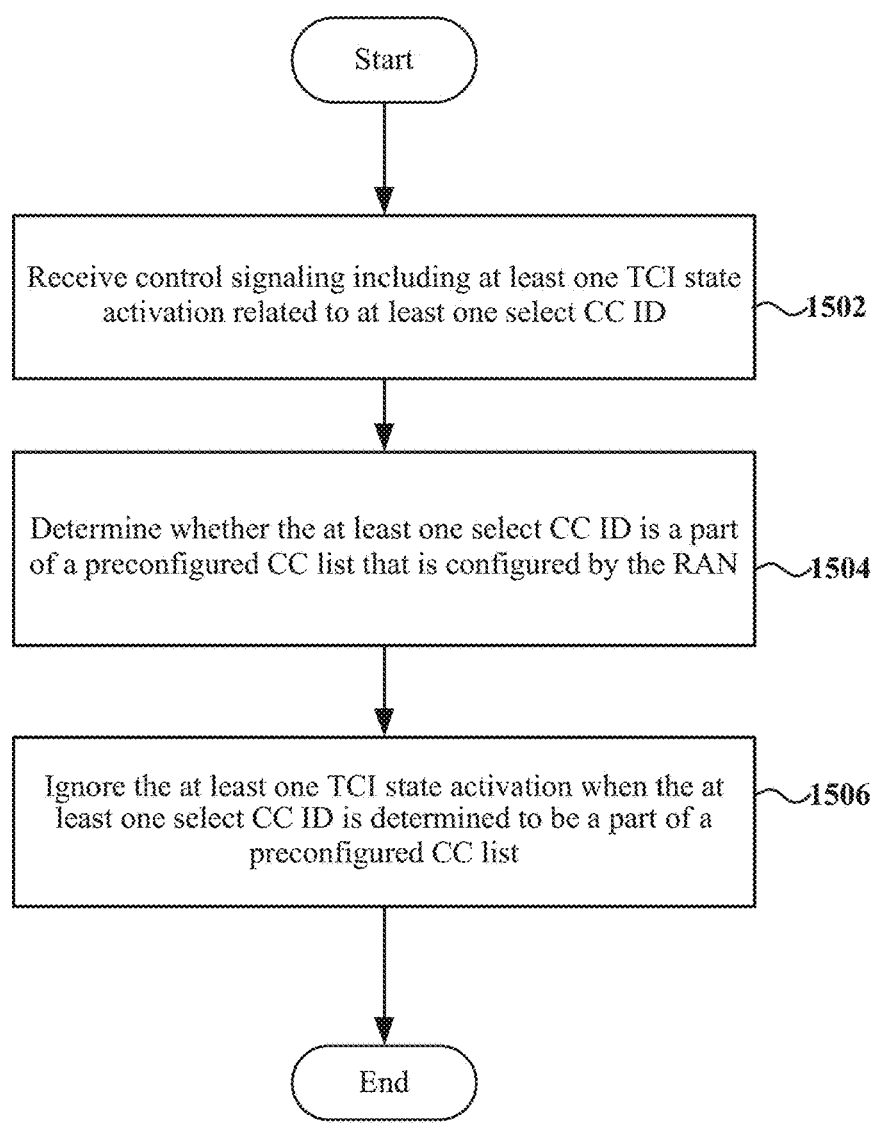
FIG. 15 is yet another flow chart of a method for receiving and updating transmission configuration indicator states (TCI-states) to utilize for multi-component communication according to some aspects.

FIG. 15 is a flow chart 1500 of a method for receiving and updating TCI-states for multi-component communication according to some aspects. In some examples, the method 1500 may be performed by the UE 1200, as described above and illustrated in FIG. 12, by a processor or processing system, or by any suitable means for carrying out the described functions.

At block 1502, UE 1200 may be configured to receive control signaling including at least one TCI state activation related to at least one select CC ID. The process in block 1402 may be implemented by circuit 1240, and/or transceiver 1210 as an example. Furthermore, the control signal may include a MAC-CE as discussed above.

Method 1500 further includes that the UE 1200 may determine whether the at least one select CC ID is a part of a preconfigured CC list that is configured by the RAN as shown at block 1504. Further, method 1500 includes ignoring the at least one TCI state activation when the at least one select CC ID is determined to be a part of a preconfigured CC list as shown at block 1506.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage, or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-15 may be rearranged and/or combined into a single component, step, feature, or function or embodied in several components, steps, or functions. Additional stages, components, steps, and/or functions may also be added without departing from novel features disclosed herein. The apparatus, devices, and/or components illustrated in FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present stages of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an stage in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the stages of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for wireless communication in a radio access network (RAN) node for a RAN having a plurality of transmission and reception points (TRPs), comprising:
    configuring a component carrier (CC) list of component carrier identifiers (IDs) to exclude a select CC ID prior to sending a transmission configuration indicator (TCI) state activation within control signaling to at least one user equipment (UE) in the RAN, wherein the control signaling comprises a single media access control (MAC) control element (MAC-CE) that is configured to communicate the TCI state activation to the at least one UE for a set of beam IDs shared by multiple CCs used by the at least one UE; and
    transmitting the configured CC list to the UE through radio resource control (RRC) signaling.

2. The method of claim 1, wherein the MAC-CE signaling is configured such the TCI state activation is configured to signal to the at least one UE that the TCI state activation applies to the select CC ID that is indicated in the MAC-CE signaling.

3. The method of claim 2, wherein the select CC ID is excluded from the CC list.

4. The method of claim 1, wherein the MAC CE is configured as a TCI States Activation/Deactivation signal where each codepoint in a TCI field in downlink control information DCI indicates at least two different TCI state IDs within the MAC-CE.

5. The method of claim 4, where each TCI state ID corresponds to a respective transmission and reception point (TRP) and an associated scheduled physical downlink shared channel (PDSCH).

6. A radio access network (RAN) node in a RAN of a wireless communication system having a plurality of transmission and reception points (TRPs), comprising:
    a wireless transceiver;
    a memory; and
    a processor communicatively coupled to the wireless transceiver and the memory, wherein the processor and the memory are configured to:
        configure a component carrier (CC) list of component carrier identifiers (IDs) to exclude a select CC ID prior to sending a transmission configuration indicator (TCI) state activation within control signaling to at least one user equipment (UE) in the RAN, wherein the control signaling comprises a single media access control (MAC) control element (MAC-CE) that is configured to communicate the TCI state activation to the at least one UE for a set of beam IDs shared by multiple CCs used by the at least one UE; and transmit the configured CC list to the UE through radio resource control (RRC) signaling.

7. The RAN node of claim 6, wherein the MAC-CE signaling is configured such the TCI state activation is configured to signal to the at least one UE that the TCI state activation applies to the select CC ID that is indicated in the MAC-CE signaling.

8. The RAN node of claim 7, wherein the select CC ID is excluded from the CC list.

9. The RAN node of claim 7, wherein the MAC CE is configured as a TCI States Activation/Deactivation signal where each codepoint in a TCI field in downlink control information DCI indicates at least two different TCI state IDs within the MAC-CE.

10. The RAN node of claim 9, where each TCI state ID corresponds to a respective transmission and reception point (TRP) and an associated scheduled physical downlink shared channel (PDSCH).

11. A method for wireless communication in a radio access network (RAN) node for a RAN having a plurality of transmission and reception points (TRPs), comprising:

configuring a component carrier (CC) list of component carrier identifiers (IDs) to include a select CC ID prior to sending a transmission configuration indicator (TCI) state activation within control signaling to at least one user equipment (UE) in the RAN, wherein the control signaling comprises media access control (MAC) control element (MAC-CE) signaling that is configured to communicate the TCI state activation to the at least one UE for a set of beam IDs shared by multiple CCs used by the at least one UE; and transmitting the configured CC list to the UE through radio resource control (RRC) signaling.

12. The method of claim 11, wherein the MAC CE includes the select CC ID.

13. The method of claim 11, wherein the MAC CE is configured as a TCI States Activation/Deactivation signal where each codepoint in a TCI field in downlink control information DCI indicates at least two different TCI state IDs within the MAC-CE.

14. The method of claim 13, where each TCI state ID corresponds to a respective transmission and reception point (TRP) and an associated scheduled physical downlink shared channel (PDSCH).

15. A radio access network (RAN) node in a RAN of a wireless communication system having a plurality of transmission and reception points (TRPs), comprising:

a wireless transceiver;

a memory; and a processor communicatively coupled to the wireless transceiver and the memory, wherein the processor and the memory are configured to:

configure a component carrier (CC) list of component carrier identifiers (IDs) to include a select CC ID prior to sending a transmission configuration indicator (TCI) state activation within control signaling to at least one user equipment (UE) in the RAN, wherein the control signaling comprises media access control (MAC) control element (MAC-CE) signaling is configured to communicate the TCI state activation to the at least one UE for a set of beam IDs shared by multiple CCs used by the at least one UE; and transmit the configured CC list to the UE through radio resource control (RRC) signaling.

16. The RAN node of claim 15, wherein the MAC CE includes the select CC ID.

17. The RAN node of claim 15, wherein the MAC CE is configured as a TCI States Activation/Deactivation signal where each codepoint in a TCI field in downlink control information DCI indicates at least two different TCI state IDs within the MAC-CE.

18. The RAN node of claim 17, where each TCI state ID corresponds to a respective transmission and reception point (TRP) and an associated scheduled physical downlink shared channel (PDSCH).

* * * * *